United States Patent [19]
Endoh et al.

[11] Patent Number: 5,819,103
[45] Date of Patent: Oct. 6, 1998

[54] INFORMATION RECORDING/ REPRODUCING APPARATUS AND METHOD

[75] Inventors: Naoki Endoh, Chiba-ken; Toshimitsu Kaneko; Shunichi Numazaki, both of Yokohama, all of Japan

[73] Assignee: Kabushiki Kaisha Toshiba, Kawasaki, Japan

[21] Appl. No.: 308,549

[22] Filed: Sep. 21, 1994

[30] Foreign Application Priority Data

Sep. 21, 1993 [JP] Japan .................................. 5-234480

[51] Int. Cl.$^6$ ............................................. G06F 15/00
[52] U.S. Cl. .................... 395/821; 395/309; 395/135; 395/821
[58] Field of Search .......................... 395/154, 162, 395/155, 600, 133, 135, 173, 174, 501, 520, 335, 850, 872, 821, 309; 369/32, 13, 58; 360/9.1, 35.1, 10.3

[56] References Cited

U.S. PATENT DOCUMENTS

| | | | |
|---|---|---|---|
| 5,241,671 | 8/1993 | Reed et al. ............................... | 395/600 |
| 5,253,120 | 10/1993 | Endoh . | |
| 5,261,041 | 11/1993 | Susman ................................... | 395/173 |
| 5,276,805 | 1/1994 | Hamaguchi ............................. | 395/164 |
| 5,317,549 | 5/1994 | Maeda et al. ........................... | 369/32 |
| 5,341,361 | 8/1994 | Hosaka .................................. | 369/275.3 |
| 5,361,173 | 11/1994 | Ishii et al. .................................. | 360/27 |
| 5,379,158 | 1/1995 | Yamagata et al. ....................... | 369/9.1 |
| 5,384,908 | 1/1995 | Mackinlay et al. ..................... | 395/152 |
| 5,392,265 | 2/1995 | Takezawa ................................ | 369/32 |
| 5,410,522 | 4/1995 | Yokota et al. ........................... | 369/32 |
| 5,491,591 | 2/1996 | Lemelson .............................. | 360/35.1 |
| 5,502,807 | 3/1996 | Beachy ................................... | 395/152 |
| 5,583,979 | 12/1996 | Sonohara et al. ....................... | 395/173 |

FOREIGN PATENT DOCUMENTS

| | | |
|---|---|---|
| 63-197213 | 8/1988 | Japan . |
| 1-158486 | 6/1989 | Japan . |

*Primary Examiner*—Meng-Ai T. An
*Assistant Examiner*—Raymond N. Phan
*Attorney, Agent, or Firm*—Oblon, Spivak, McClelland, Maier & Neustadt, P.C.

[57] ABSTRACT

An information recording/reproducing apparatus includes a first processing unit, a link information generating unit, a link information storage unit, and a second processing unit. The first processing unit processes information constituted by a plurality of information units and subjected to a recording/reproducing operation. The link information generating unit generates link information representing the relationship between arbitrary information units of the information units constituting the information. The link information storage unit stores the link information generated by the link information generating unit. The second processing unit performs predetermined processing with respect to the link information when an information unit corresponding to the link information stored in the link information storage unit is processed by the first processing unit.

2 Claims, 25 Drawing Sheets

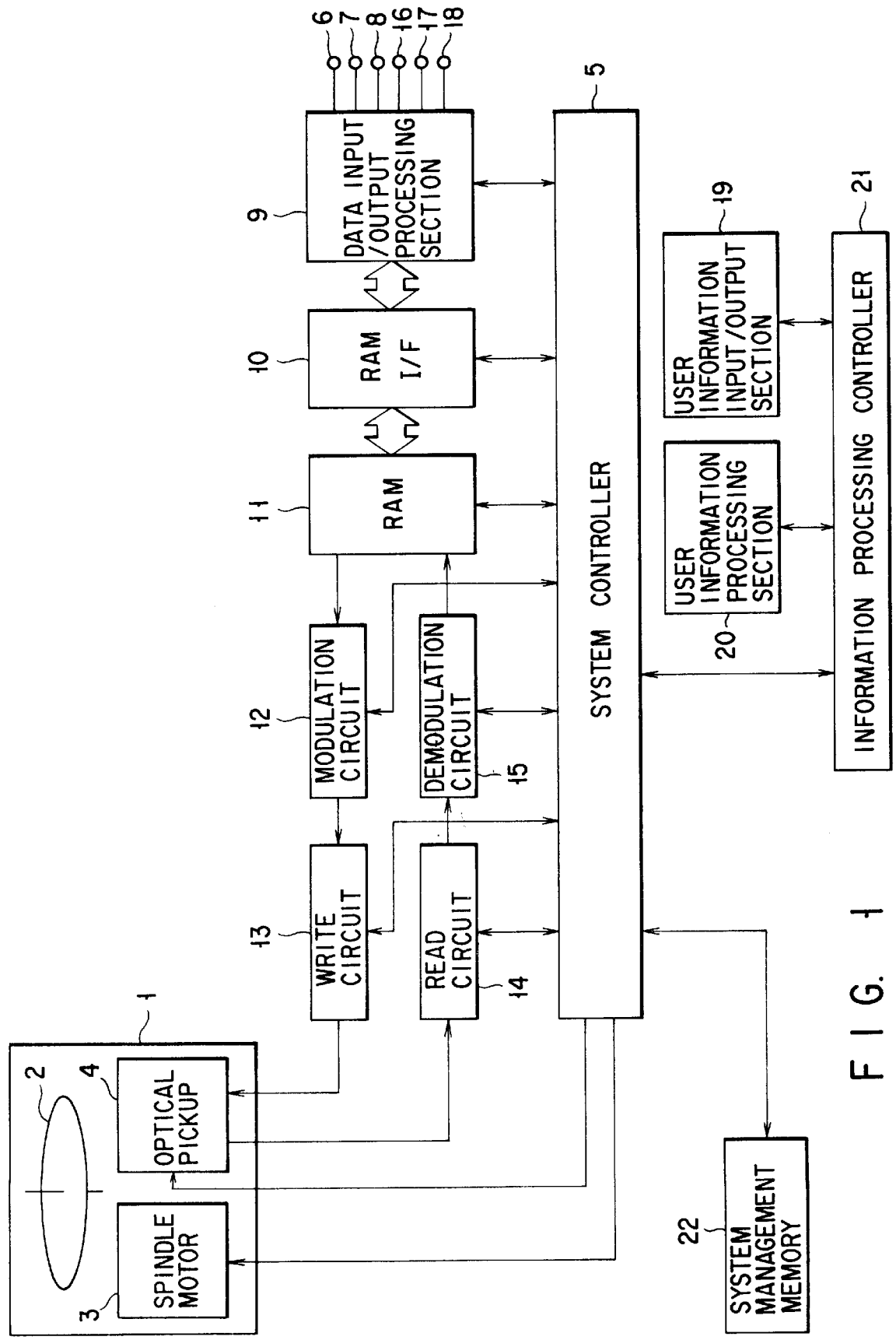
F I G. 1

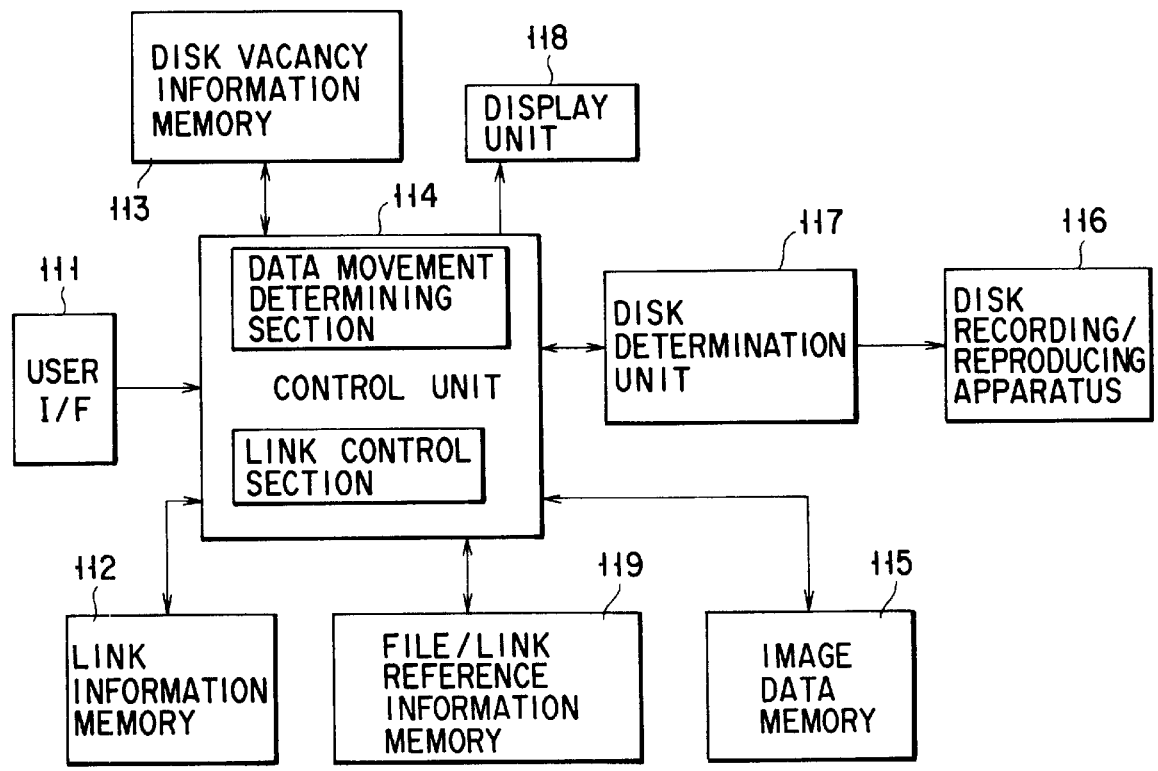
F I G. 4
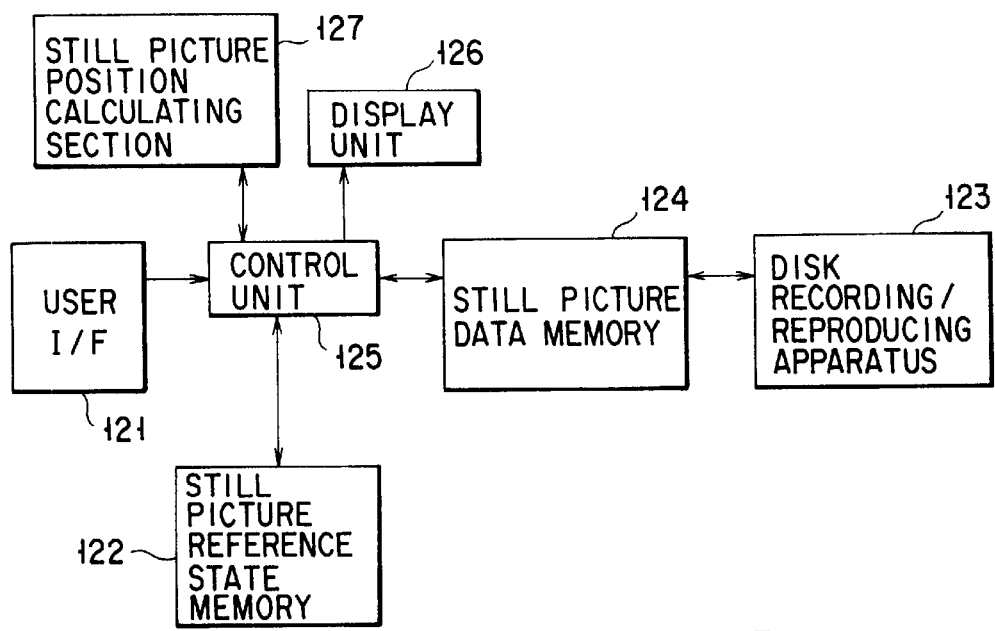
F I G. 5

F I G. 11
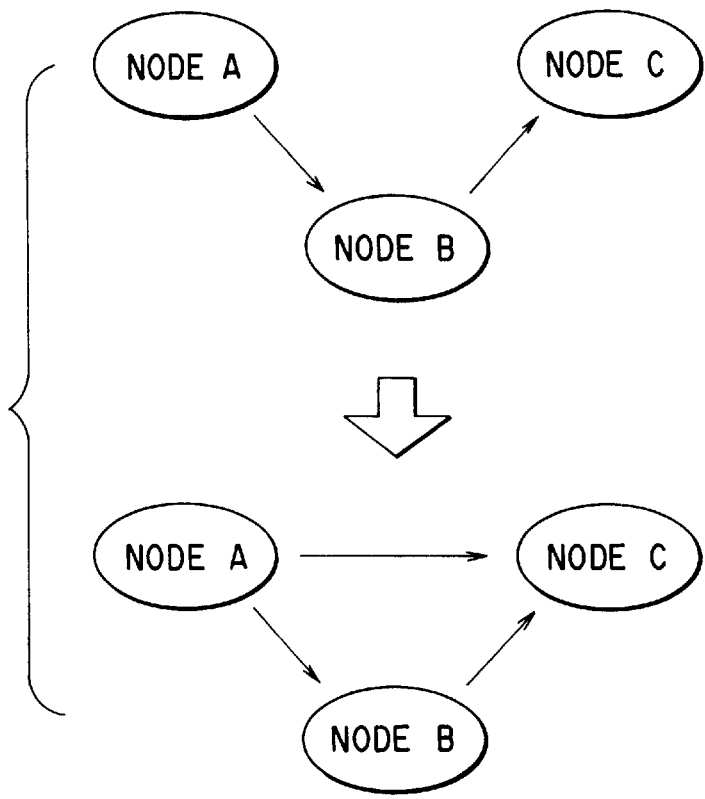
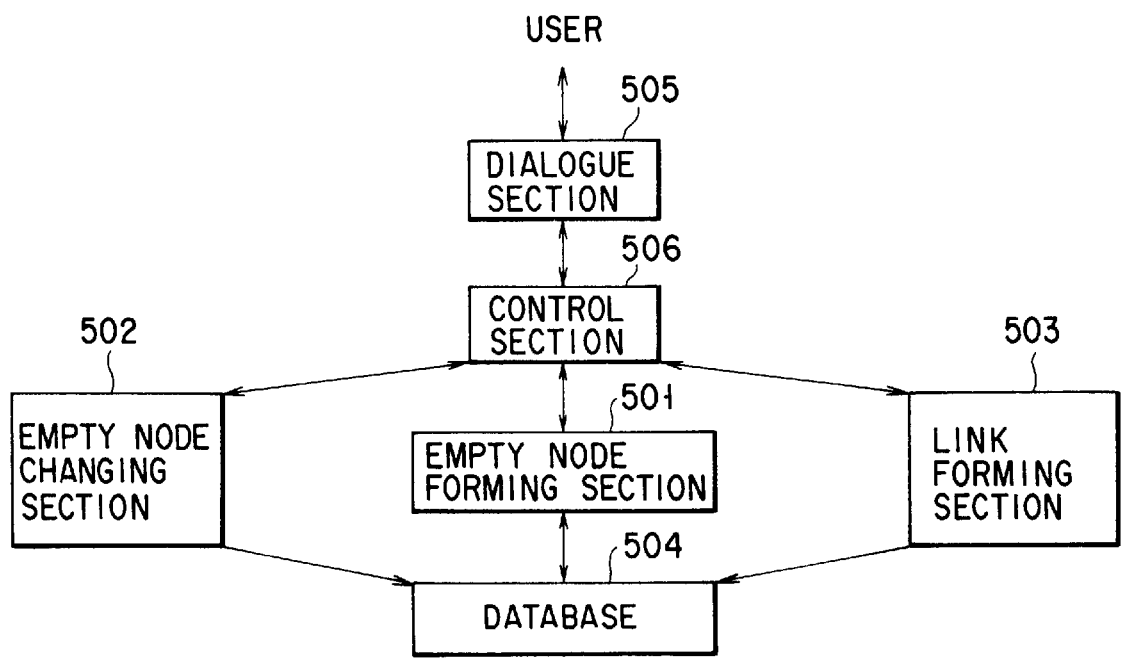
F I G. 13

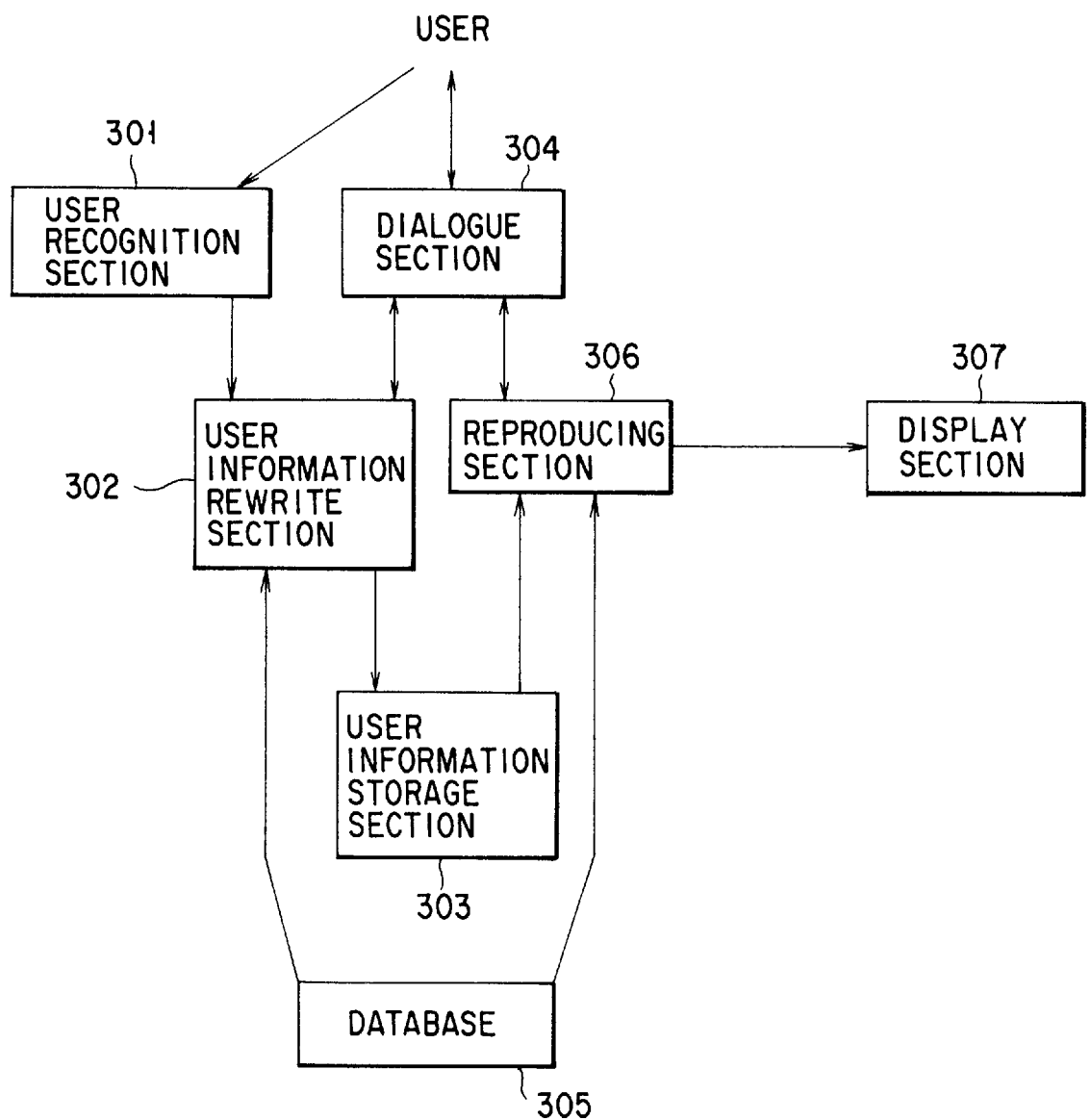
F I G. 12

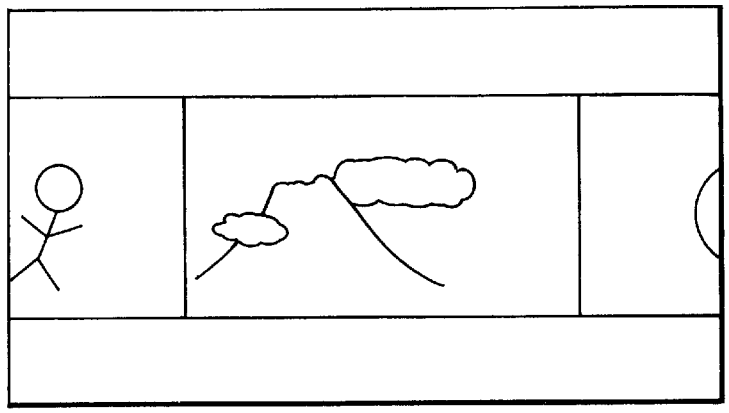
F I G. 25
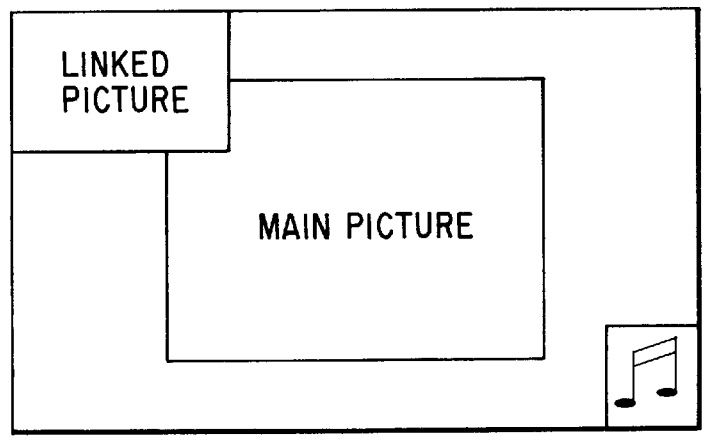
F I G. 26
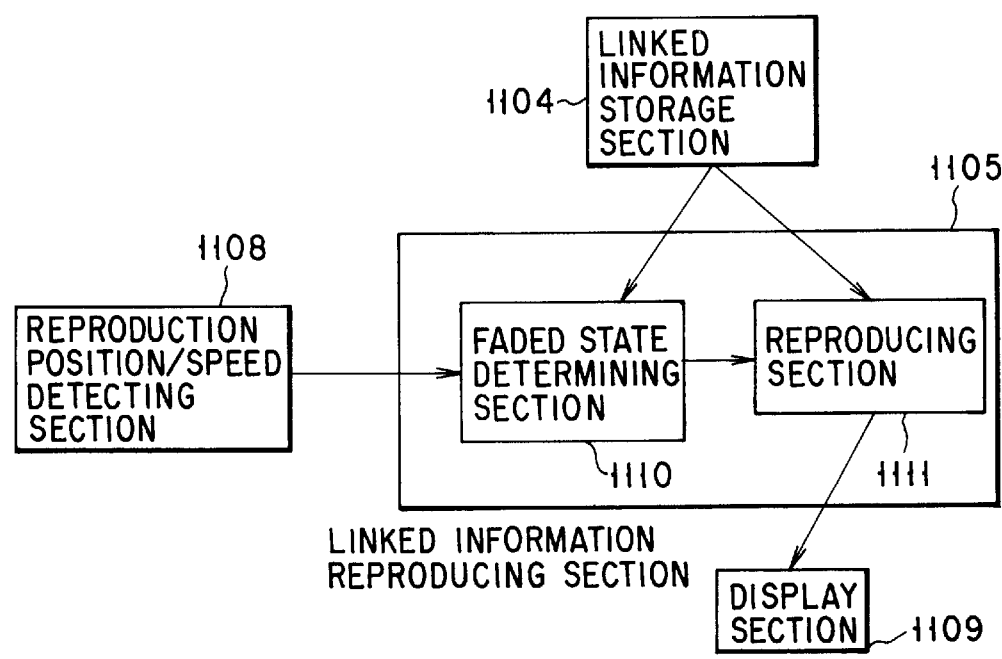
F I G. 28

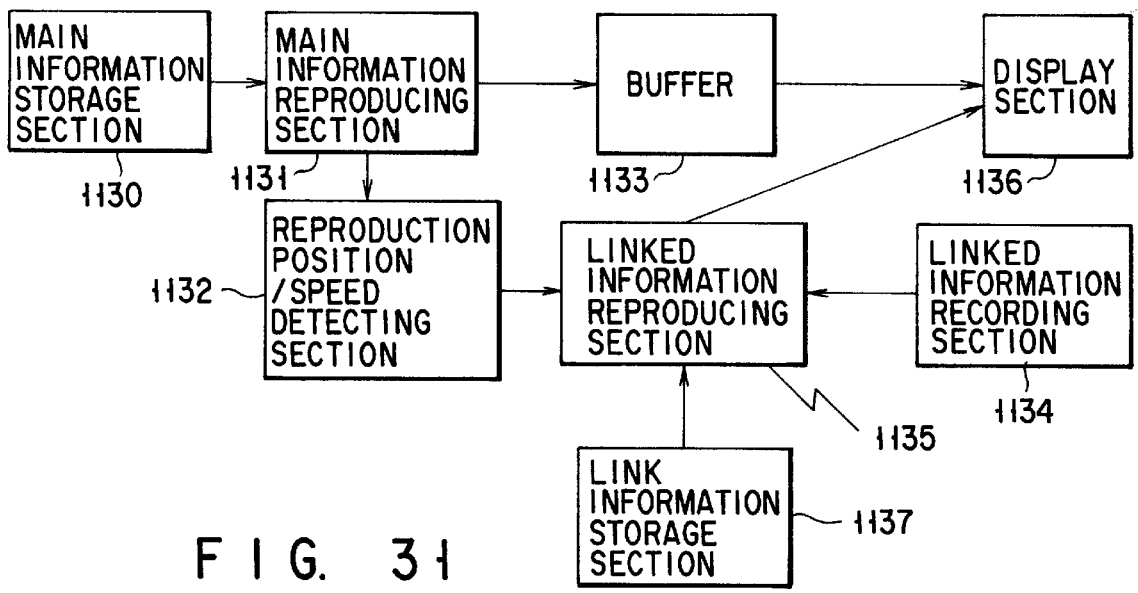
F I G. 31
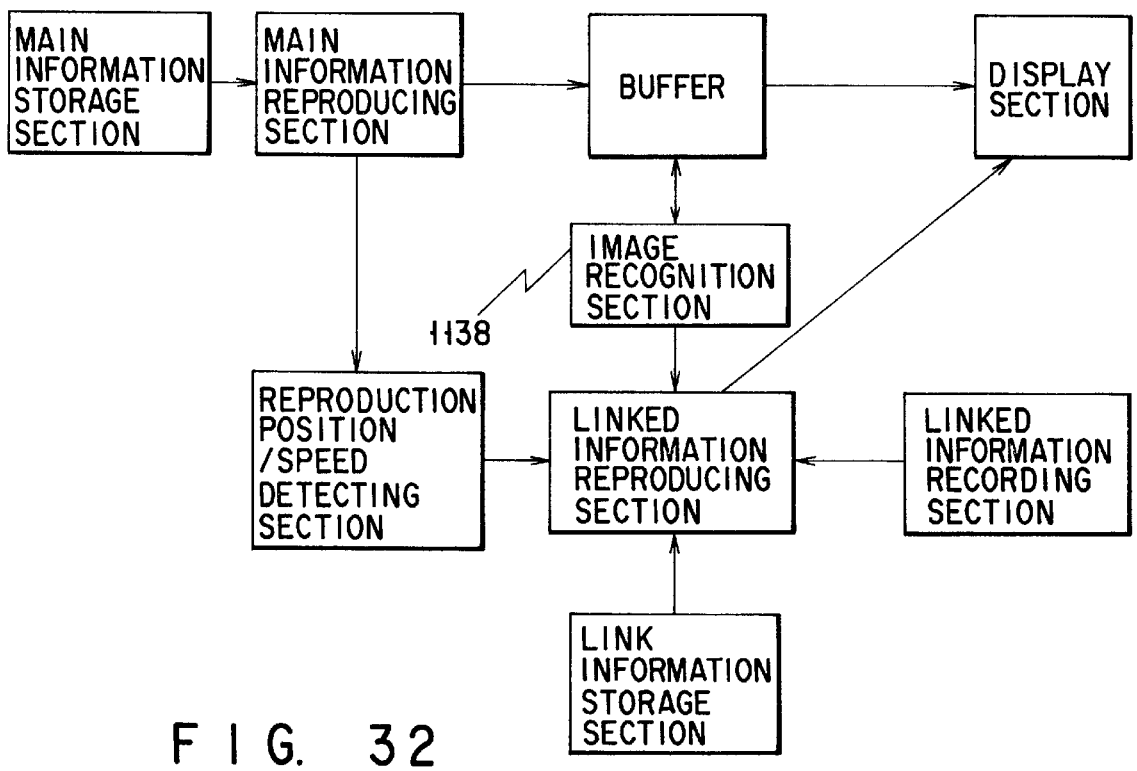
F I G. 32

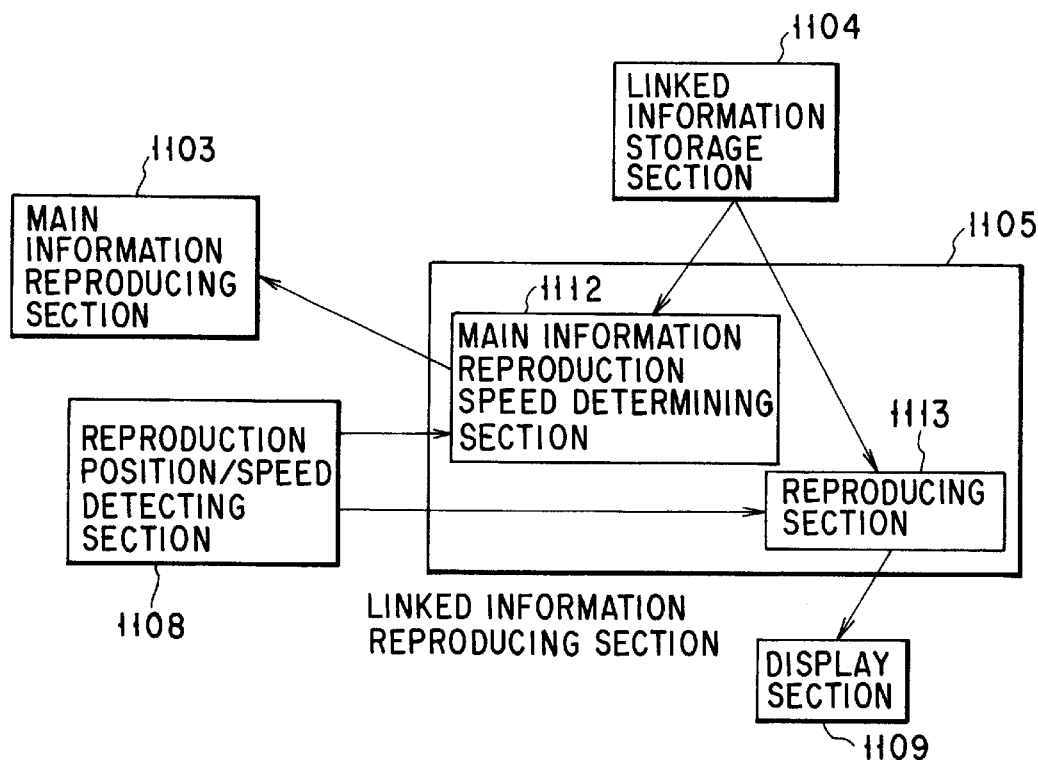
F I G. 33
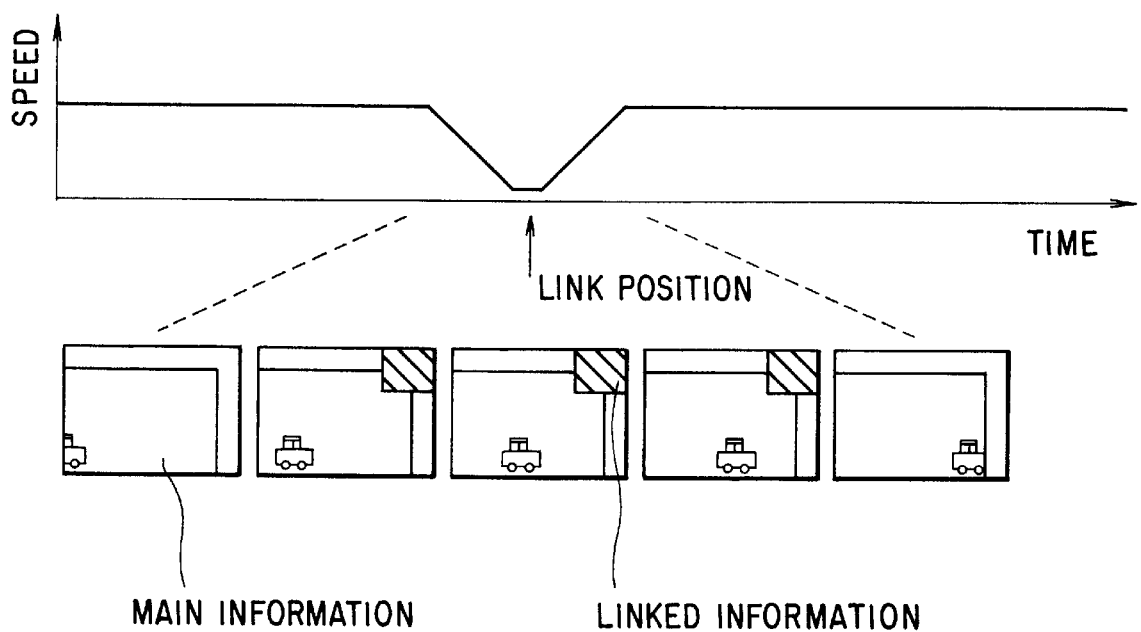
F I G. 34

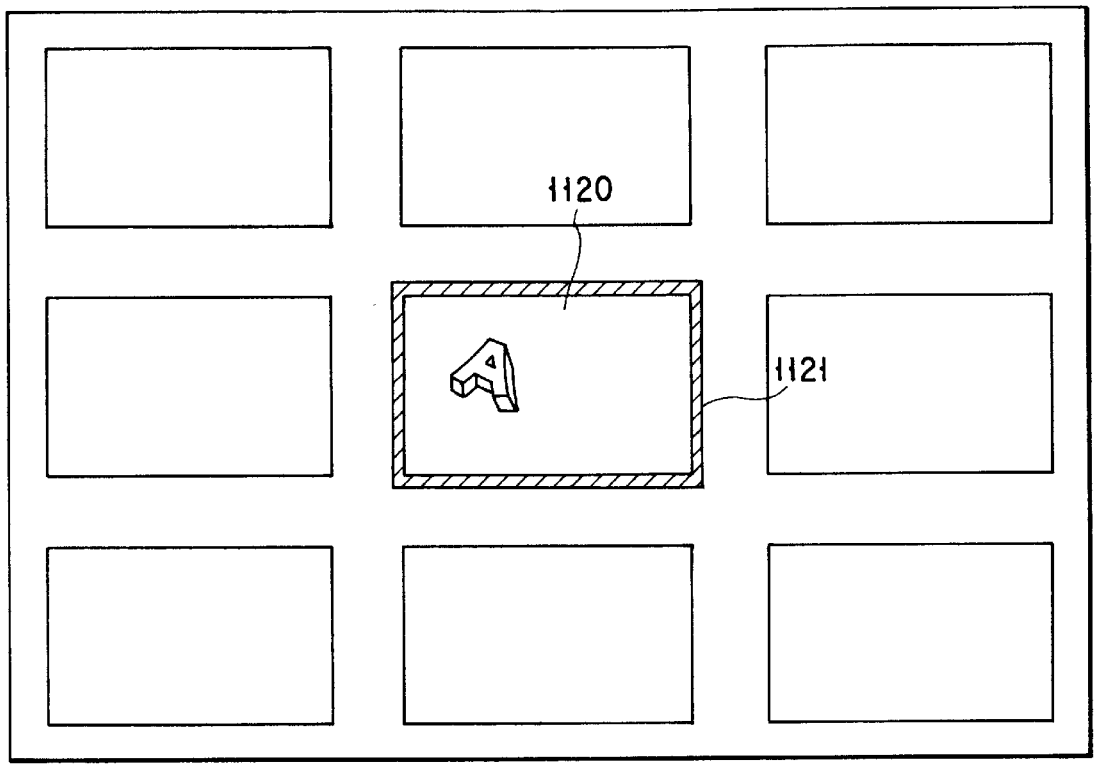
F I G. 35
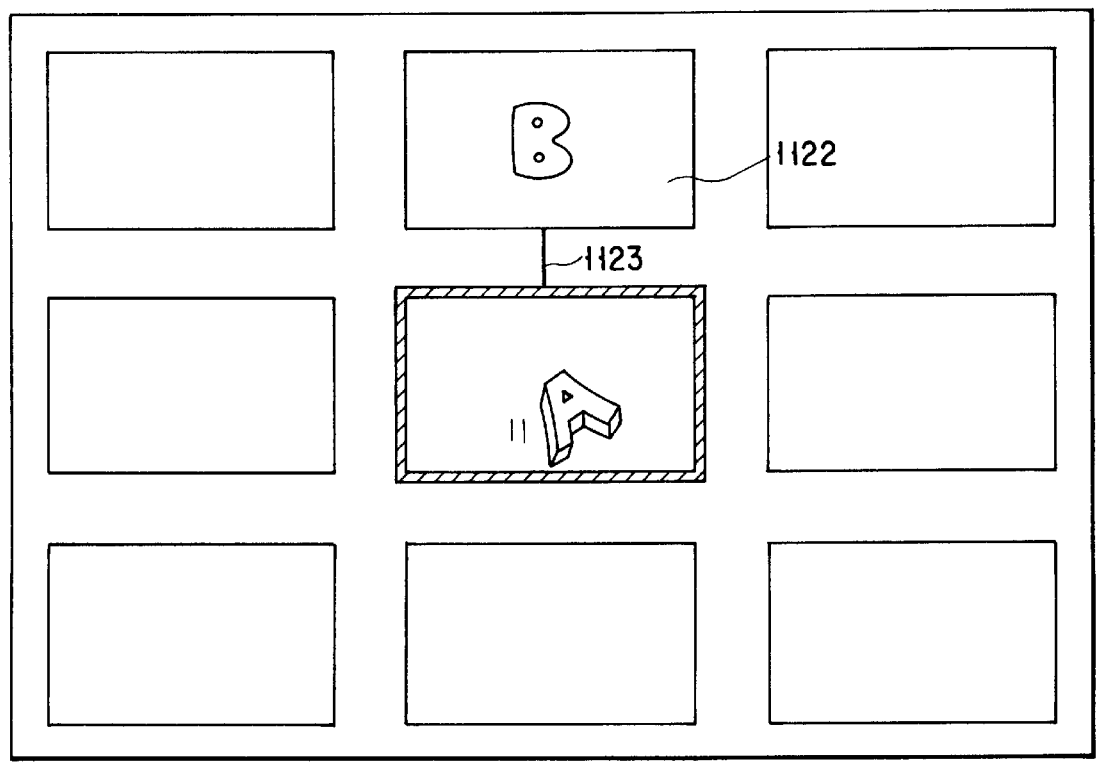
F I G. 36

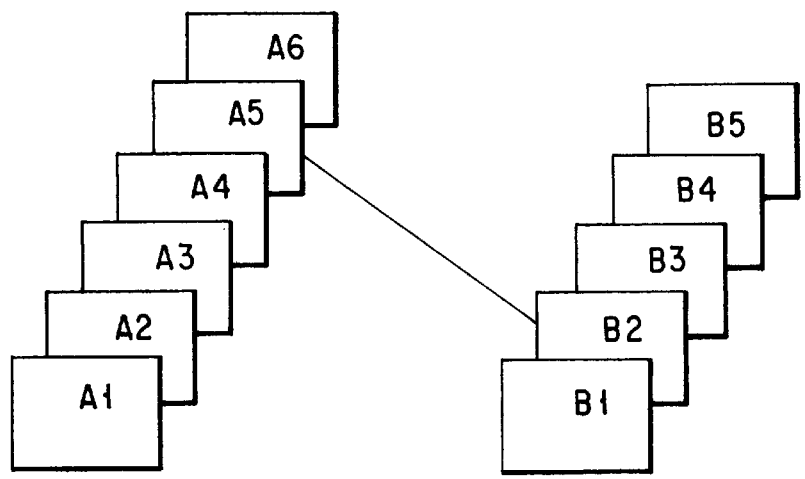
F I G. 37
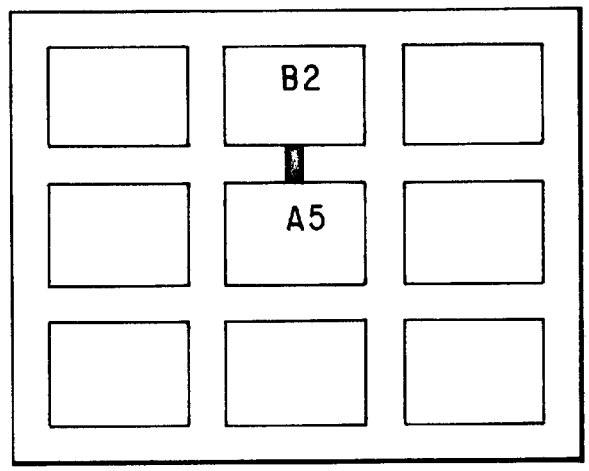
F I G. 38
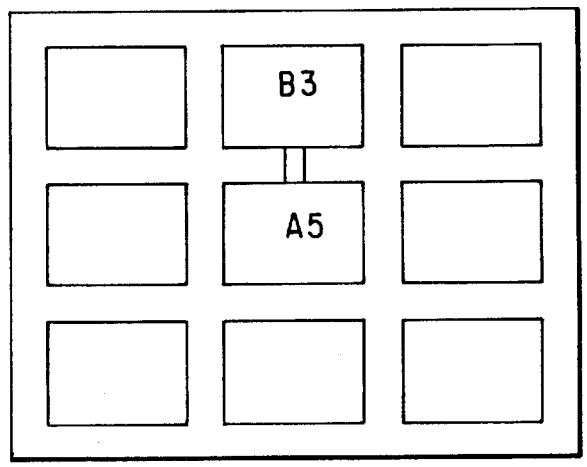
F I G. 39

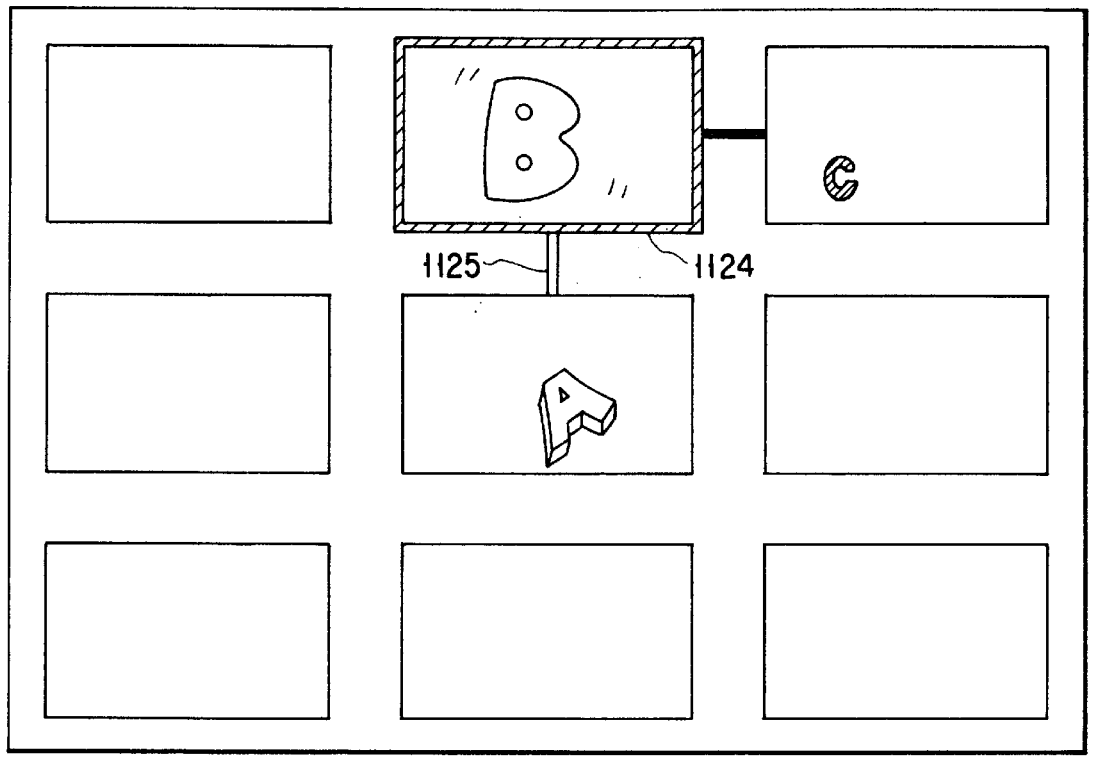
F I G. 40
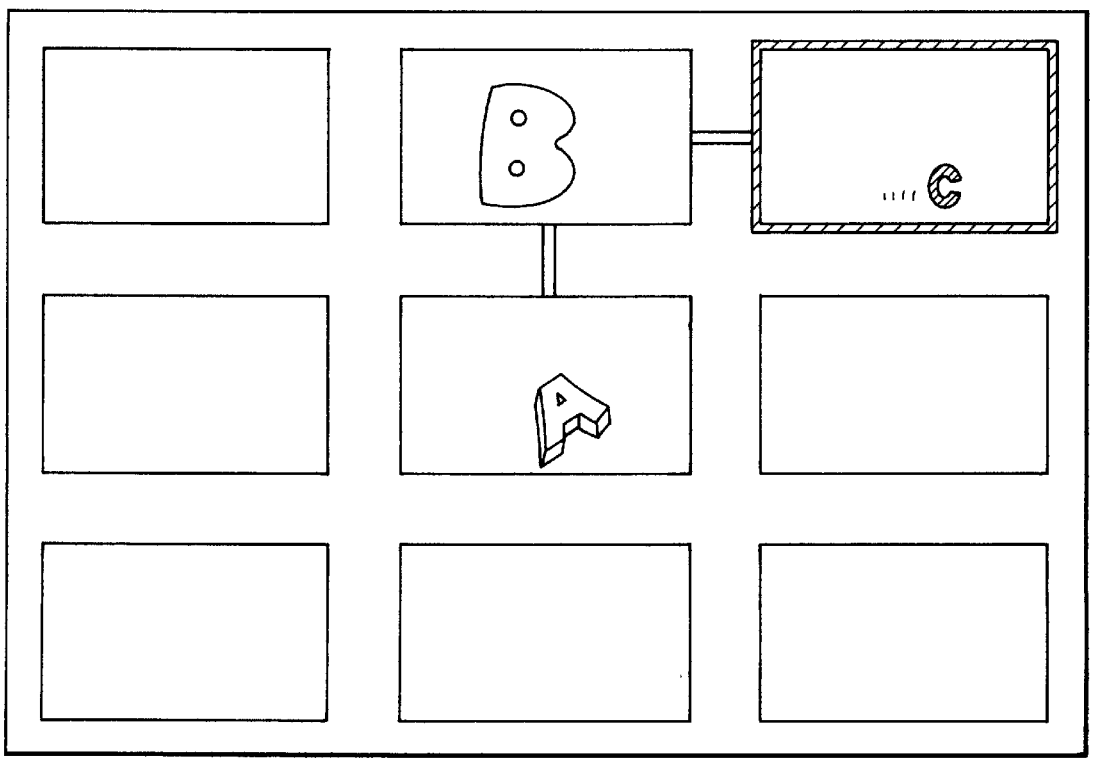
F I G. 41

INFORMATION RECORDING/REPRODUCING APPARATUS AND METHOD

BACKGROUND OF THE INVENTION

1. Field of the Invention

The present invention relates to an information recording/reproducing apparatus and method and, more particularly, to an apparatus for recording/reproducing video information such as dynamic picture or still picture information and audio information.

2. Description of the Related Art

As a recording/reproducing apparatus expected to become popular in the future, an apparatus is known, which is capable of digitizing video information such as dynamic picture or still picture information and audio information, and recording/reproducing the digital information on/from a recording medium such as an optical disk. Since an apparatus of this type uses an optical disk as a recording medium, the access speed with respect to information can be greatly increased as compared with a conventional apparatus using a magnetic tape as a recording medium. In addition, since information is recorded, as digital data, on an optical disk, an error correction technique can be used, and a deterioration in information quality, caused in a process of recording/reproduction, can be minimized. Furthermore, various data other than information can be independently recorded/reproduced in such a manner that the data are recorded on a semiconductor memory or recorded on a disk at separate recording positions. Therefore, the apparatus can have a high functionality.

For example, second information to Nth information can be linked with first information by using special information called link information. By this linking, various meanings can be attached to relationships between pieces of information. For example, (a) memoranda of characters in a movie, which are made by a user, or a map indicating the scene of a story is linked, as a still picture, with one scene of the movie, (b) a photograph or the singing of a bird taken/recorded by the user when he/she records dynamic pictures on video is linked with a dynamic picture, and (c) many still pictures recorded on a disk can be grouped with high flexibility by using a link connecting pictures of a daughter, a link connecting pictures of steam locomotives, a link connecting pictures of family trips, and the like.

However, no effective methods of link processing in processing information and copying information have been proposed with respect to a recording method used in a new information recording/reproducing apparatus which handles link information defined between pieces of video and audio information.

In a conventional system, files recorded on disks are linked, and the corresponding link information is recorded on a memory in an information recording/reproducing apparatus so that when a file connected to one end of a link is referred to from another file connected to the other end of the link, a specific disk on which the file to be referred to is recorded can be presented to the user. In this system, once a file is recorded on a disk, the file is normally kept recorded on the initial recording position unless the file is deleted. Therefore, the optimal recording position of a file at a given time point from the viewpoint of minimizing the time required for access to another file connected to the given file via a link may not remain optimal after other files are sequentially recorded. For this reason, it is preferable that the recording position of a file be properly changed after it is recorded. In a conventional system, files recorded on a hard disk are rearranged within the hard disk such that one data is recorded on consecutive sectors, at the most. Especially, movement of files between a plurality of disks must be performed by each user by himself/herself.

Assume that a plurality of still pictures are displayed, and a search for a desired still picture is to be performed. In this case, in a conventional system, a plurality of frames in which still pictures are arranged are prepared on one screen, and equal display ranges are assigned to the respective frames, so that the still pictures are displayed at positions irrelevant to the mutual relationships between the still pictures. In this case, the still pictures are generally arranged at equal intervals. Assume a link is to be referred to from a still picture. In this case, when the link connected to the still picture is selected, the still picture to which the link is connected appears on the screen.

In a recording/reproducing apparatus which can link files related to each other, files are linked in accordance with instructions from the user. More specifically, the user determines specific files which are to be linked, and issues corresponding instructions. As a result, a link structure for all files is generated. It is very difficult for general users to plan a link structure to be finally generated from the beginning and link files accordingly. For this reason, a complicated link structure may be generated.

In a box in which disks are to be stored, the user stores the disks in a certain order to facilitate searches for files. If the disks are stored randomly, it takes time to search for a desired disk. Since disks are removed from the box by a user, they must be stored by a method which allows the user to easily remove a desired disk.

When management of disks is to be performed by an information recording/reproducing apparatus, management information for a disk is loaded upon insertion of the disk into the information recording/reproducing apparatus. When the information in a disk is rewritten by an information recording/reproducing apparatus owned by the user, management information is immediately loaded. However, when information is rewritten by using another information recording/reproducing apparatus, the user must load the management information in the apparatus. In managing the information in each disk, the disk must be inserted into the information recording/reproducing apparatus to load management information.

Furthermore, in a conventional apparatus, information is recorded/reproduced in unit of media. For example, video information is recorded/reproduced on/from a VTR, and audio information is recorded/reproduced on/from a tape recorder. As a still picture, a photograph has been conventionally used. Recently, an electronic still camera has been developed, and still pictures can be electronically and easily processed. In addition, these pieces of information are increasingly digitized so that these different media can be systematically handled on a computer. Such systems are called multimedia and hypermedia systems, which have recently attracted a great deal of attention. In one form of these systems, video information, audio information, and the like are treated as nodes, and the nodes are linked with each other to form a database.

SUMMARY OF THE INVENTION

It is the first object of the present invention to provide an information recording/reproducing apparatus and method which can realize proper processing in processing and copying information when link information is defined between pieces of video information and audio information.

It is the second embodiment of the present invention to provide an information recording/reproducing apparatus and method which is easy to operate and provides a natural operation environment.

In order to achieve the first object of the present invention, there is provided an information recording/reproducing apparatus comprising:

first processing means for processing information constituted by a plurality of information units and subjected to a recording/reproducing operation;

link information generating means for generating link information representing a relationship between arbitrary information units of the information units constituting the information;

link information storage means for storing the link information generated by the link information generating means; and second processing means for performing predetermined processing with respect to the link information when an information unit corresponding to the link information stored in the link information storage means is processed by the first processing means.

In order to achieve the second object, there is provided an information recording/reproducing apparatus comprising:

means for reproducing main information including a specific object;

means for reproducing linked information related to the main information; and means for controlling a reproduction timing of the linked information in accordance with link information representing a relationship between the main information and the linked information and reproduction speed information of the main information.

In addition, in order to achieve the second object, there is also provided an information recording/reproducing apparatus comprising:

means for reproducing main information including a specific object;

means for reproducing linked information related to the main information; and means for controlling a reproduction speed of the main information in accordance with link information representing a relationship between the main information and the linked information and reproduction speed information of the main information.

In order to achieve the first object of the present invention, there is provided an information recording/reproducing method comprising:

a first processing step of processing information constituted by a plurality of information units and subjected to a recording/reproducing operation;

a link information generating step of generating link information representing a relationship between arbitrary information units of the information units constituting the information;

a link information storage step of storing the link information generated by the link information generating step; and a second processing step of performing predetermined processing with respect to the link information when an information unit corresponding to the link information stored in the link information storage step is processed by the first processing step.

In order to achieve the second object, there is provided an information recording/reproducing method comprising:

a step of reproducing main information including a specific object;

a step of reproducing linked information related to the main information; and a step of controlling a reproduction timing of the linked information in accordance with link information representing a relationship between the main information and the linked information and reproduction speed information of the main information.

In addition, in order to achieve the second object, there is also provided an information recording/reproducing method comprising:

a step of reproducing main information including a specific object;

a step of reproducing linked information related to the main information; and a step of controlling a reproduction speed of the main information in accordance with link information representing a relationship between the main information and the linked information and reproduction speed information of the main information.

With regard to the first object, according to the present invention, in an information recording/reproducing apparatus or method capable of recording/reproducing video information, audio information, and the like, link information representing the relationship between arbitrary information units such as dynamic picture, still picture, and audio information units can be generated and stored. When processing is performed with respect to an information unit for which such link information is generated and stored, predetermined processing is also performed with respect to this link information. For example, when a portion of a dynamic picture is separated and combined with another dynamic picture, link information for this portion is changed in accordance with the processing. Therefore, the role (e.g., being one element of a record of growth of a user's son) of the portion in a video link is retained.

In relation to the second object, according to the present invention, in displaying one or both of main information and linked information, a highly efficient browsing operation can be performed by controlling the reproduction timing of the linked information or the reproduction speed of the main information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiment given below, serve to explain the principles of the invention.

FIG. 1 is a block diagram showing the schematic arrangement of an information recording/reproducing apparatus using optical disks according to an embodiment of the present invention;

FIG. 4 is a block diagram showing the schematic arrangement of an information recording/reproducing apparatus according to another embodiment of the present invention;

FIG. 5 is a block diagram showing the schematic arrangement of an information recording/reproducing apparatus according to still another embodiment of the present invention;

FIG. 11 is a view showing the manner of automatically generating links;

FIG. 12 is a block diagram showing a database system according to still another embodiment of the present invention;

FIG. 13 is a block diagram showing a database system according to still another embodiment of the present invention;

FIG. 25 is a view showing film feed type reproduction;

FIG. 26 is a view showing a picture displayed together with linked information and audio link information;

FIG. 28 is a block diagram showing a linked information reproducing section according to still another embodiment of the present invention;

FIG. 29 is a view showing the relationships among link information, linked information, object coordinate information, and the like;

FIG. 31 is a block diagram showing a linked information reproducing system according to still another embodiment of the present invention;

FIG. 32 is a block diagram showing a modification of the linked information reproducing system in FIG. 31;

FIG. 33 is a block diagram showing a linked information reproducing section according to still another embodiment of the present invention;

FIG. 34 is a view showing the relationships among main information, reproduction speed, displayed information, and the like; and FIGS. 35 to 43 are views showing how operations are performed and the screen is changed when a plurality of pieces of video information are complicatedly related to each other via links.

DETAILED DESCRIPTION OF THE PREFERRED EMBODIMENTS

Figure 2:
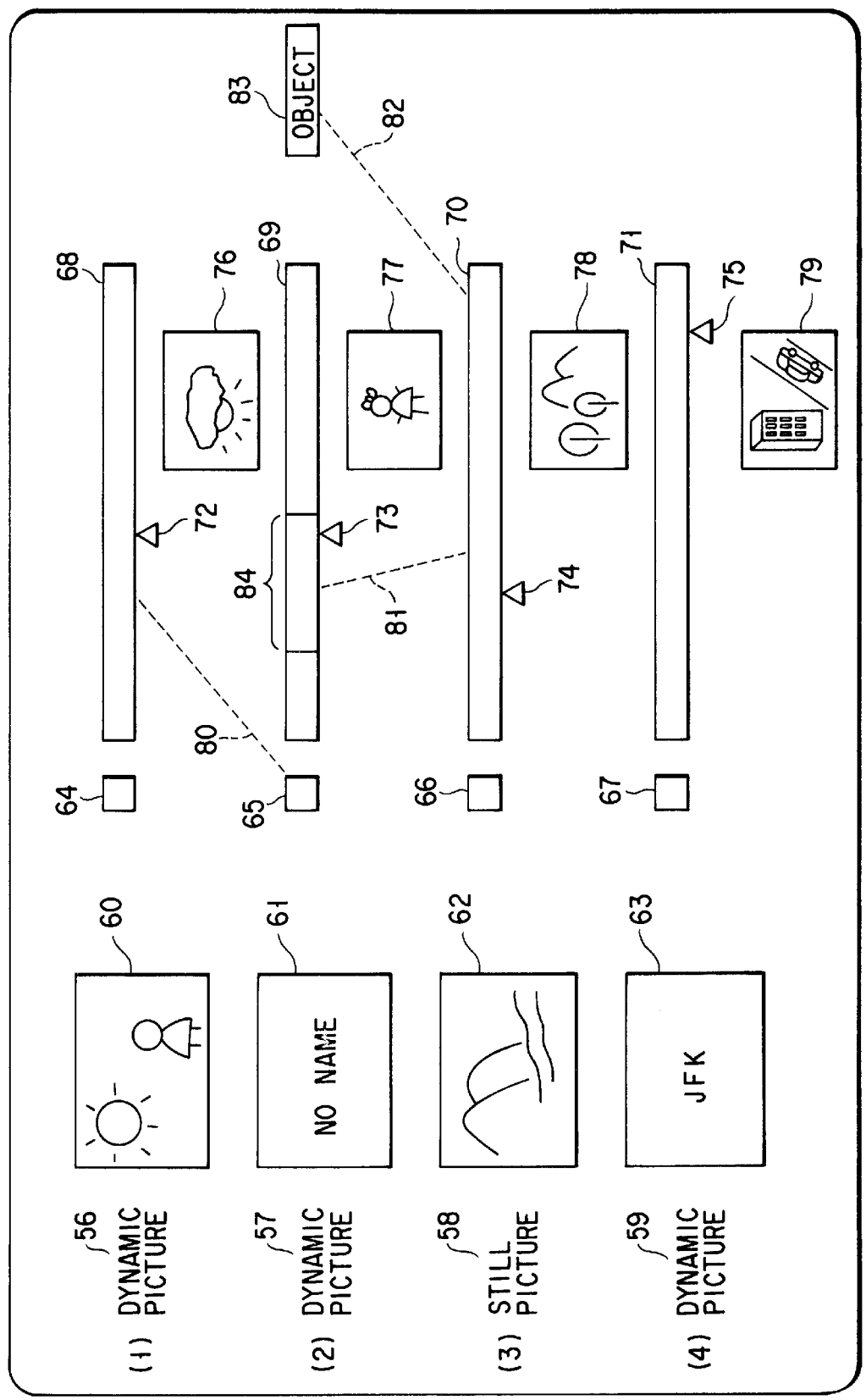
FIG. 2 is a view showing a screen for defining/displaying links according to the embodiment in FIG. 1.

Embodiments of the present invention will be described below with reference to the accompanying drawings.

FIG. 1 shows the arrangement of an information recording/reproducing apparatus using optical disks according to the present invention. Note that the arrangement of this information recording/reproducing apparatus itself is the same as that of each of the second to sixth embodiments to be described later.

Referring to FIG. 1, reference numeral 1 denotes an optical disk recording/reproducing section, which is constituted by an optical disk 2, a spindle motor 3, and an optical pickup 4. The optical disk 2 is rotated by the spindle motor 3. Signals are recorded/reproduced on/from the optical disk 2 by the optical pickup 4 incorporating a semiconductor laser. Rotation drive control of the spindle motor 3 and various control operations (e.g., seek control) with respect to the optical pickup 4 are performed by a system controller 5 mainly constituted by a microcomputer and its software.

The optical disk recording/reproducing section 1 preferably includes an auto-changer which operates under the control of the system controller 5, and also has a system management memory 22 for managing information in a large number of optical disks so that these optical disks can be systematically handled. More specifically, a user need not be conscious of what information is written in which optical disk. For this purpose, when a new optical disk is inserted, address assignment, which is performed in units of optical disks, is performed with respect to the new optical disk. The system controller 5 describes the assignment result in the system management memory 22. Thereafter, access to each optical disk is performed on the basis of the contents of the system management memory 22. That is, the system management memory 22 records the same attribute information as that recorded on the optical disk group in information units. The relationship between the housing positions of the respective optical disks and the addresses assigned in units of optical disks in the system should be maintained to keep a high access speed. If this relationship collapses for some reason, the user is requested to perform restore processing of the optical disk positions, or autonomous restore processing (exchange) is performed by using a spare space in the optical disk auto-changer in which optical disks can be stored. In addition, information recorded on an optical disk removed from an optical disk housing portion may be changed. The fact that an optical disk is removed or a new optical disk is inserted may be detected by detecting the ON/OFF state of the contact point of a microswitch arranged for each optical disk housing slot. In this case, when an optical disk is inserted in the same slot again, the contents of the optical disk are compared with those stored in the system management memory 22. If they do not coincide, the user must determine whether to update the system management memory 22, and give a corresponding instruction. In general, the attribute information on the optical disk in the same system is updated. In this case, the contents of the system management memory 22 are subjected to update processing.

A video signal (dynamic picture), a video signal (still picture), and a audio signal, as information signals to be recorded, are respectively input via terminals 6, 7, and 8. These signals may be analog or digital signals. As dynamic picture signals, television program signals transmitted via a radio wave or a cable (not shown) may be input, and signals from a package device such as a video camera may also be input upon a copying operation. As still picture signals, signals from an electronic camera, an image scanner, a personal computer, a communication line, and the like may be input via a cable, an IC card, a floppy disk, and the like. As audio signals, signals from a microphone and a cable may be input, and signals from various package media may be input upon a copying operation. Each of the signals input via the terminals 6, 7, and 8 is converted into digital information with a predetermined format by a data input/output processing section 9, and is supplied to a RAM I/F 10. The data is temporarily stored in a RAM 11 under the control of the RAM I/F 10. This data is supplied from the RAM 11 to a modulation circuit 12 at a predetermined timing so as to be subjected to modulation processing for a recording operation. The modulated record data is supplied to a write circuit 13. The data undergoes predetermined write processing in the write circuit 13. The processed record data is supplied to the optical pickup 4 to be recorded on the optical disk 2.

The data written in the optical disk 2 in this manner is read by the optical pickup 4 and supplied to a read circuit 14 to be converted from an analog waveform into digital data. This digital data undergoes demodulation processing for reproduction in a demodulation circuit 15 and is temporarily stored in the RAM 11. The data is read out from the RAM 11 under the control of the RAM I/F 10 to be supplied to the data input/output processing section 9, in which video and audio signals are reproduced and output in a proper form via terminals 16, 17, and 18. Alternatively, the terminal 16 may serve as a video output terminal for outputting both dynamic and still picture signals.

A user information input/output section 19 is controlled by an information processing controller 21 to display a message sent from the system to the user, give link information and an instruction, input by the user, to the system, and receive time information and the like required for controlling the corresponding operation. The section 19 also causes the system to detect user information and recorder information indicating a specific person who recorded given information. The various information input by the user and the various information detected by the system, which are acquired by the user information input/output section 19, are supplied to a user information processing section 20 under the control of the information processing controller 21, and are processed, as will be described later.

Attribute information and link information associated with information to be reproduced are recorded on a management area set on the same optical disk 2 on which the information to be reproduced is recorded, and are read together with the information to be reproduced. These pieces of information are written in the RAM 11 via the optical pickup 4, the read circuit 14, and the demodulation circuit 15, and selectively read out by the system controller 5 to be supplied to the user information processing section 20 via the information processing controller 21.

Input information is sometimes accompanied by attribute information. This attribute information is input to the RAM 11 via the data input/output processing section 9 and the RAM I/F 10. Thereafter, the information is selectively read out by the system controller 5 to be supplied to the user information processing section 20 via the information processing controller 21. Since the attribute information includes information associated with a history of processing, such as reproduction history information, the information is updated by the user information processing section 20 at a proper timing after reproduction processing of a given information unit is completed. The resultant information is then recorded on the optical disk 2 via the information processing controller 21, the system controller 5, the RAM 11, the modulation circuit 12, the write circuit 13, and the optical pickup 4.

In the information processing apparatus of the present invention shown in FIG. 1, a relationship can be established between arbitrary information units. This relationship will be referred to as a link.

Examples of how links are defined will be described below. FIG. 2 shows a screen for defining/displaying links. Referring to FIG. 2, four information units (1) to (4) are displayed, and the types of the information units are expressed by words such as "dynamic picture" and "still picture" (56 to 59). Frames 60 to 63 are title frames assigned to the respective information units. Symbols 64 to 67 represent the entire information units, respectively. Symbols 68 to 71 represent the total lengths/numbers of the information units. Symbols 72 to 75 represent cursors for displaying portions corresponding to the respective information units on small frames 76 to 79 located at lower right positions of the screen. Broken lines 80, 81, and 82 represent currently existing links. A symbol 83 indicates that there is a link for an intra-video object. That is, the user defines links by determining desired positions by moving the cursors 72 to 75 on this screen. When a link structure is determined in this manner, the following processing is performed.

The user information input/output section 19 transfers this link structure as information to the user information processing section 20 via the information processing controller 21. The user information processing section 20 determines the identification codes of the respective links by using management information transferred from the optical disk 2 or the system management memory 22, and converts the addresses of the links into real addresses, thereby converting the links into data which can be recorded on the optical disk 2 or the system management memory 22. In practice, various data such as a frequency of use and a name can be added to each link. The links defined in this manner are recorded on the optical disk 2 or the system management memory 22 at a proper timing.

Assume that a portion 84 of the dynamic picture (2) in FIG. 2 is re-defined as one independent dynamic picture (5), that is, the portion 84 is copied to another free area. In this case, the broken line 81 is connected to the portion 84 to indicate the presence of a link. Therefore, the apparatus processes link information in the following steps.

1) The portion 84 is copied to a predetermined free area, and its real address is held. This change is recorded on the optical disk 2 or the system management memory 22.

2) It is checked whether a link exists within a range corresponding to the portion 84 on the dynamic picture (2).

3) If a link exists, the contents of the above link information are converted on the basis of the real address of the new portion 84.

4) The above conversion result is recorded, as new link information, on the optical disk 2 or the system management memory 22.

Figure 3:
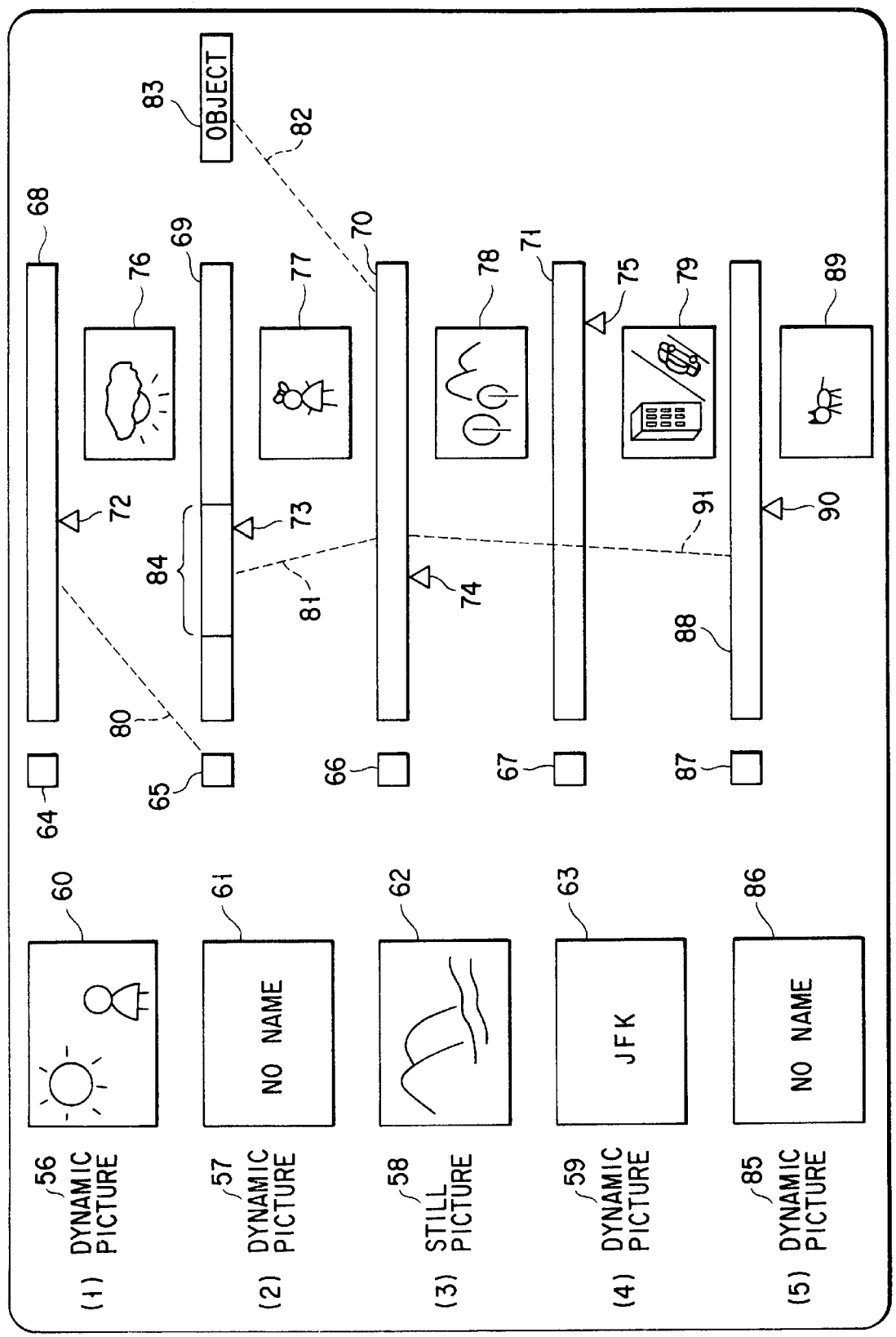
FIG. 3 is a view showing a screen for defining/displaying links according to the embodiment in FIG. 1.

5) The contents of the screen (FIG. 2) for defining/displaying the link are updated on the basis of the results of 1) to 4) to obtain the screen shown in FIG. 3.

Referring to FIG. 3, a newly formed dynamic picture (5) is expressed by words 85, a frame 86, symbols 87 and 88, a small frame 89, and a symbol 90. The state of the link newly formed in the above steps is expressed by a broken line 91.

Referring to FIG. 2, when the dynamic picture (2) is to be copied to another apparatus, the following steps can be performed in the present invention.

1) It is checked whether the dynamic picture (2) to be copied has a link. 2) If it has a link, corresponding link information is extracted. 3) The extracted link information is expressed by a relative address translated from the real address of an information unit. 4) A list of information units linked with the dynamic picture (2) is formed. 5) The dynamic picture (2), its attribute information, the changed link information, the information units included in the list, and their attribute information are transmitted.

On the reception side, the above procedure is basically reversed. However, a new identification code is set for the link information in accordance with the system on the reception side. Note that if linked information units are not required, corresponding system settings must be performed.

In the above embodiment, there is no description on the manner of handling links associated with audio information. It is, however, apparent that such links can be handled in the same manner as described above.

FIG. 4 shows the arrangement of another embodiment. A user I/F 111 is a remote control button, a hand-writing input unit, a keyboard, or a pointing device such as a mouse or a track ball. A link information memory 112 is a semiconductor memory or a magnetic disk for recording link information of every file recorded on disks owned by the user. The contents of the link information memory 112 are updated when the link information is changed. A disk vacancy information memory 113 is a semiconductor memory for recording the remaining capacity information of each disk owned by the user. A control unit 114 controls the overall system. The control unit 114 includes a link control section and a data movement determining section. The link control section calculates the strength of a link between files on the basis of the initial set value and the number of times the link is used, and causes the link information memory 112 to store the resultant data. The data movement determining section refers to the memories 112 and 113 to determine whether a given file needs or can be moved between disks. An image data memory 115 temporarily stores image data when the data is to be moved between disks. A disk recording/reproducing apparatus 116 reads data recorded on a disk, and writes information on a disk. A disk determination unit 117 determines which disk is currently inserted in the disk recording/reproducing apparatus 116. A display unit 118 displays image data recorded on a disk and a message. A file/link reference information memory 119 serves to record file/link reference rates.

Information about each link between files recorded on a disk owned by the user is recorded on the link information memory 112, together with the strength of the link, which is calculated by the control unit 114 on the basis of the number of times the linked files are referred to. The strength of a link is calculated such that the strength increases as the frequency of reference increases, and vice versa. A strong link between files in different disks means that the user often refers to the files upon switching the disks. It is apparent that files having a strong link therebetween are preferably recorded on the same disk. The control unit 114 determines whether to move one of linked files stored in different disks from one disk to the other disk. This determination is performed on the basis of the strength of the link between the files and disk vacancy information recorded on the disk vacancy information memory 113. The determination is performed depending on whether the strength of the link exceeds a predetermined threshold value or the total strength of links between the disks can be reduced to a value smaller than a predetermined threshold value. As is apparent, if the remaining capacity of each disk is not large enough to allow movement of a file, the determination of file movement is not performed. If determination of file movement is performed, the corresponding file is moved from one disk to the other disk by one of the following methods, i.e., method 1 to method 3.

(Method 1)

Which one of the files is to be moved to the disk in which the other file is recorded is determined by other links for the respective files. In this case, a file is moved from one disk to the other disk in such a manner that the number of links (total strength) between the disks is decreased upon file movement. Assume that a link is present between a file a in a disk A and a file b in a disk B, and the system determines that the file a is moved to the disk B. In this case, the system waits for insertion of the disk A, and moves the file a to the image data memory 115 upon insertion of the disk A. At this time, the file a recorded on the disk A is deleted. Subsequently, when the disk B is inserted in the system, the system moves the file a recorded on the image data memory 115 to the disk B. Every time a file is moved, the link information recorded on the link information memory 112 is updated. While the file a is in the image data memory 115, the link information is updated into information indicating that the link destination is the file a recorded on the image data memory 115.

(Method 2)

Which one of the files is to be moved is determined in the same manner as in method 1. In method 2, when the file a is moved to the image data memory 115, the file a recorded on the disk A is not immediately deleted. Other operations are the same as those in method 1. The above operation in method 2 is performed in consideration of the possibility that the user may search the disk A for the file a without fully recognizing that the file a has been moved to a different disk. Therefore, the file a recorded on the disk A is not necessary after the user fully recognizes the movement of the file a. For this reason, after the file a is moved, the file a on the disk A is deleted when the rate at which file a on the disk A is referred becomes lower than the rate at which the file a on the disk B is referred by a predetermined threshold value. (Method 3)

The files a and b are recorded on both the disks A and B. For this purpose, when the disk A is inserted into the system, the file a is copied to the image data memory 115. When the disk B is inserted into the system next time, the file a is moved from the image data memory 115 to the disk B. When the disk B is inserted into the system, the file b is copied to the image data memory 115. When the disk A is inserted into the system next time, the file b is moved from the image data memory 115 to the disk A. As is apparent, either the file a or the file b may be moved first. After the files are moved, information indicating which one of the disks is referred for the files is recorded on the file/link reference information memory 119. If the rate at which the files a and b on one disk are referred is lower than the rate at which the files a and b on the other disk by a predetermined threshold value, the files a and b recorded on the disk exhibiting the lower reference rate are deleted. In this case as well, every time a file is moved and deleted, the link information stored in the link information memory 112 is updated.

The above movement may be automatically performed by the system so that the user need not recognize the movement, or the system may make the user check every movement.

FIG. 5 shows the arrangement of still another embodiment. A user I/F 121 is a pointing device such as a mouse or a track ball, or a keyboard. A still picture reference state memory 122 serves to record the strength of a link between still pictures. The strength of a link is set in accordance with the rate at which the link is tracked, and is increased as the link is tracked more often. A disk recording/reproducing apparatus 123 reads out image information recorded on a disk, and updates the contents of a disk. A still picture data memory 124 is used to temporarily record data read out by the disk recording/reproducing apparatus 123. A control unit 125 controls the overall system. A display unit 126 displays image data. A still picture position calculating section 127 calculates the display position of each still image from the strength of a link for each still image. This position is calculated such that still pictures having a strong link therebetween are located as close to each other as possible.

Figure 6:
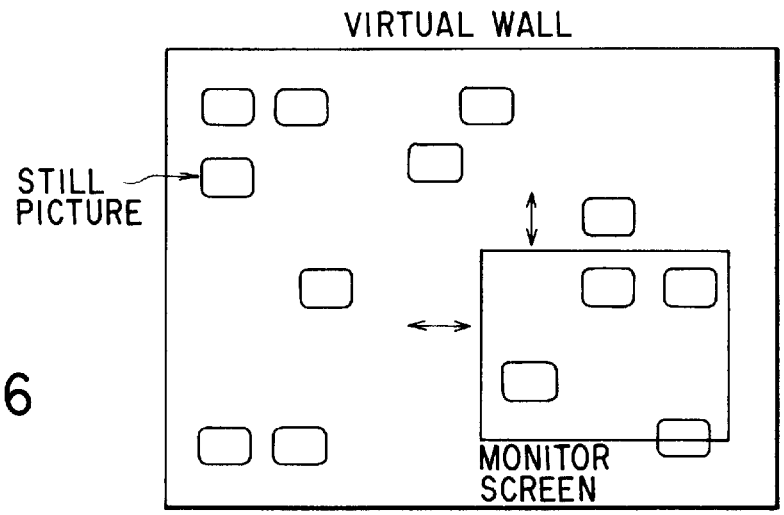
FIG. 6 is a view showing a state wherein a portion of an imaginary wall on which still pictures are stuck is displayed on a monitor.
Figure 7:
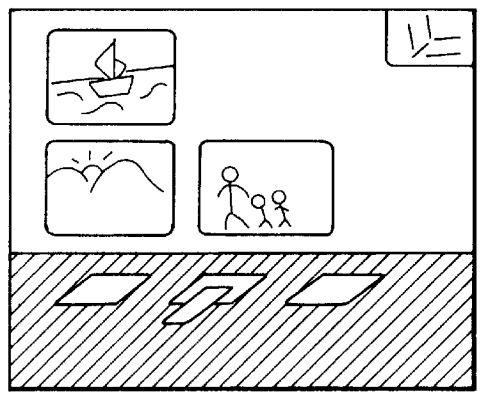
FIG. 7 is a view showing a case wherein still pictures are displayed below the imaginary wall.

Still pictures recorded on a disk are displayed on the display unit 126 as if they were painted on an imaginary wall. In a conventional system, still pictures are displayed in an order independent of the relationships between the still pictures. In the present invention, in displaying still pictures, their display positions on the wall are determined by the strength of each link for each still picture. Still pictures having a strong link therebetween are located to be relatively close to each other, whereas still pictures having a weak link therebetween are located to be relatively far from each other. The still picture position calculating section 127 calculates these positions by referring to still picture reference state data recorded on the still picture reference state memory 122. When the reference state of a still picture changes, the position of the still picture is calculated again, and the still picture is displayed at the new position. For this reason, still pictures having strong links therebetween gather, whereas still pictures having weak links therebetween are gradually separated from each other. Since still pictures which are closely related with each other are located to be close to each other, the user can easily refer to other still pictures. In practice, part or all of the wall is displayed on the display unit, and this display range can be freely changed by scrolling the screen or zooming a desired range or the like. FIG. 6 illustrates part of the imaginary wall having still pictures stuck thereon, which is displayed on a monitor. When the user designates one of the displayed still pictures by using the user I/F such as a pointing device, only the designated still picture is displayed on the screen. A mode switching button is prepared on the screen to return to the imaginary wall. When this button is designated by a pointing device or the like, the imaginary wall on which the still pictures are stuck is displayed again. A still picture which is recorded on a disk but is referred only at a rate lower than a predetermined value is not stuck on this imaginary wall but is displayed in a small size below the wall as if it peeled off from the wall. For example, such still pictures are displayed, as shown in FIG. 7. When the user designates a still picture below the wall, he/she can refer to the still picture.

Figure 8:
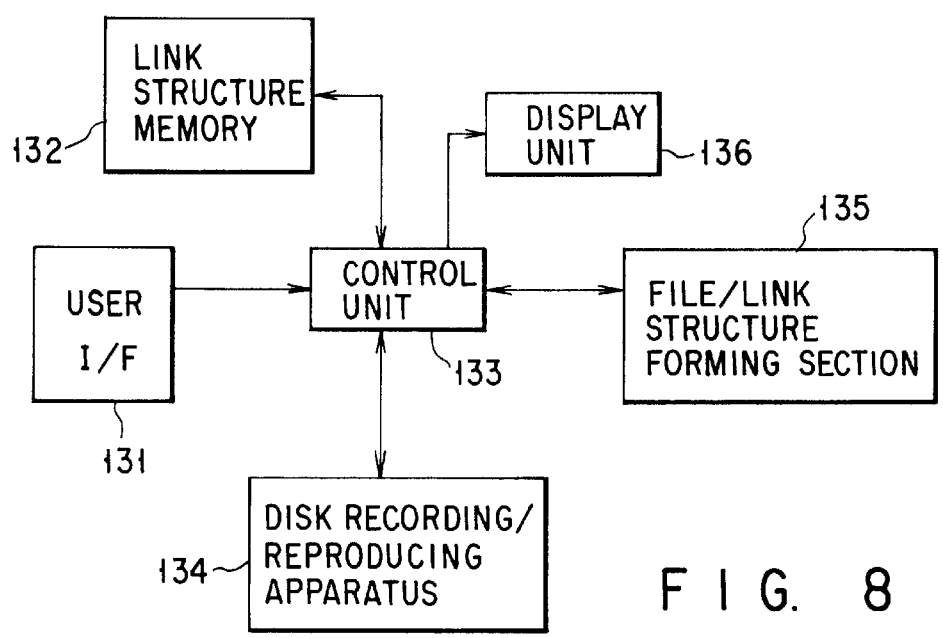
FIG. 8 is a block diagram showing the schematic arrangement of an information recording/reproducing apparatus according to still another embodiment of the present invention.

FIG. 8 shows the arrangement of still another embodiment. A user I/F 131 is a pointing device such as a mouse or a track ball, or a keyboard. A link structure memory 132 serves to store a prototype for links, such as a linear structure, a tree structure, or a radial structure. A new structure may be formed and registered in the link structure memory 132. A control unit 133 controls the overall system. A disk recording/reproducing apparatus 134 reads out information recorded on a disk, and writes information on a disk. A file/link structure forming section 135 refers to the prototype for a link structure, which is stored in the link structure memory 132, and adds link information to a file when the file is fitted in the link structure. In this case, the name and attribute information of the corresponding link can be added as instructed. A display unit 136 displays a file read out from a disk, and also displays a link structure and files in forming a link.

When the user links files, he/she selects one of a plurality of basic link structures stored in the link structure memory 132. In this manner, a plurality of basic link structures are prepared in advance. This is a characteristic feature of the present invention. A selected link structure is displayed, as a graph, on the display unit 136. The user selects nodes of the link structures and files to be fitted in the nodes by designating file names or icons using the user I/F 131, thereby fitting the files in the nodes. In addition, the user can add/delete nodes and links, and can also add names and attribute information, thereby freely reconstructing the structure into a desired structure. If creation/reconstruction associated with a link structure, e.g., adding names to links, is performed, the corresponding information is sent to the file/link structure forming section 135. As a result, files are linked or a name is added to a link in real time.

Figure 9:
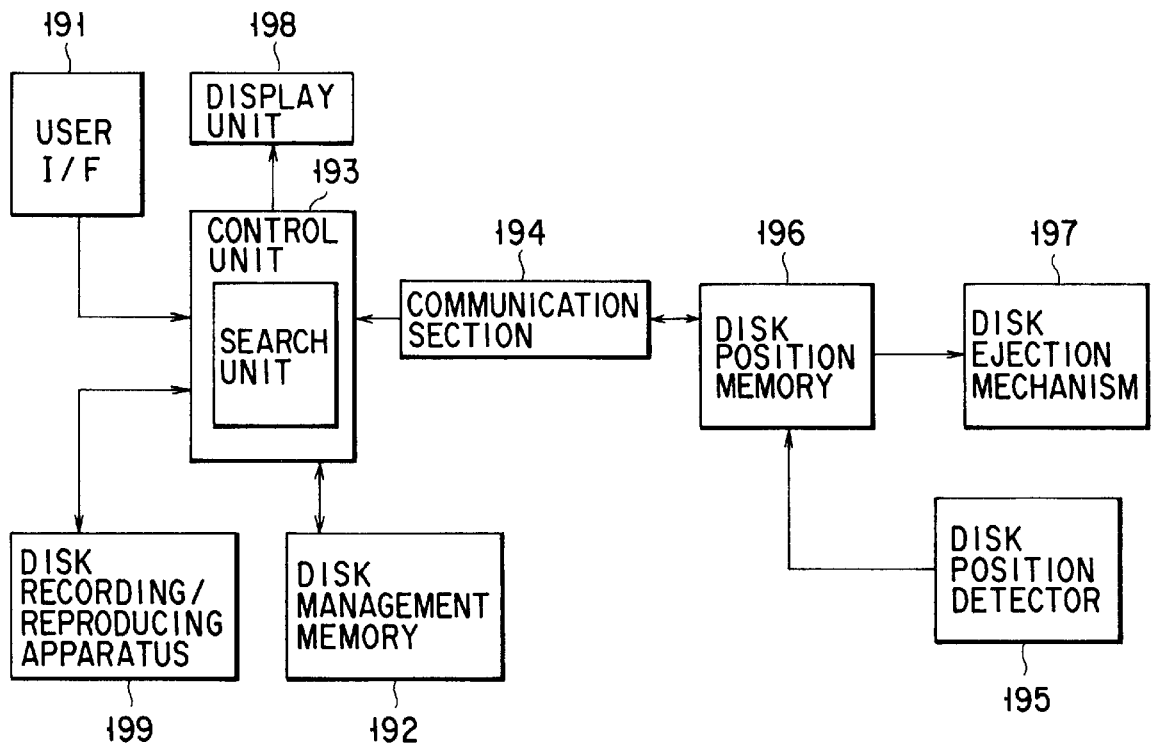
FIG. 9 is a block diagram showing the schematic arrangement of an information recording/reproducing apparatus according to still another embodiment of the present invention.

FIG. 9 shows the arrangement of still another embodiment. A user I/F 191 is a pointing device such as a mouse or a track ball, or a keyboard. A disk management memory 192 serves to record the TOC of each disk or information indicating a specific position in a disk management box at which each disk is stored. A control unit 193 performs a search operation instructed by the user I/F 191 to find a specific disk in which a target file is stored. A communication section 194 serves to exchange information between the information recording/reproducing apparatus and the disk management box. In this operation, position information about a disk to be extracted is sent from the information recording/reproducing apparatus to the disk management box by wire or radio. When the disk position is changed, the corresponding change information is sent from the disk management box to the information recording/reproducing apparatus. A disk position detector 195 detects which disk is stored at which position in the box. For example, serial numbers may be attached to disks so that the position of each disk can be detected by detecting the serial number of each disk. A disk position memory 196 is a memory for recording disk position information detected by the disk position detector 195. Upon reception of an instruction to eject a disk, a disk ejection mechanism 197 operates an ejection mechanism located at the position where the designated disk is stored, thereby ejecting the disk. A display unit 198 displays image data recorded on a disk, and also displays a message and search information. A disk recording/reproducing apparatus 199 reads/write information from/on a disk.

The information recording/reproducing apparatus stores information about each disk, stored in the disk management box, in the disk management memory 192. When the user searches for a file in the information recording/reproducing apparatus, the search unit in the control unit 193 performs a search operation by using information in the disk management memory 192. If there is a target file on a disk stored at a given position in the disk management box, the corresponding disk position information is sent to the disk management box by wire or radio.

As described above, according to the present invention, the information recording/reproducing apparatus and the disk management box share information by means of communication, and the disk management box operates in accordance with the search result obtained by the information recording/reproducing apparatus. This is a major characteristic feature of the present invention. The disk management box ejects the disk at the designated disk position by using the disk ejection mechanism 197. Every time a disk is inserted, the disk management box detects the storage position of the disk by using the disk position detector 195, and records the corresponding information on the disk position memory 196.

In addition, the disk position detector 195 is arranged in the disk management box so that any disk can be inserted at any position. This is another characteristic feature of this embodiment. The information indicating the storage position of this disk is also sent to the information recording/reproducing apparatus via the communication section 194. The information recording/reproducing apparatus stores the sent disk information in the disk management memory 192 to use it for a search operation.

Figure 10:
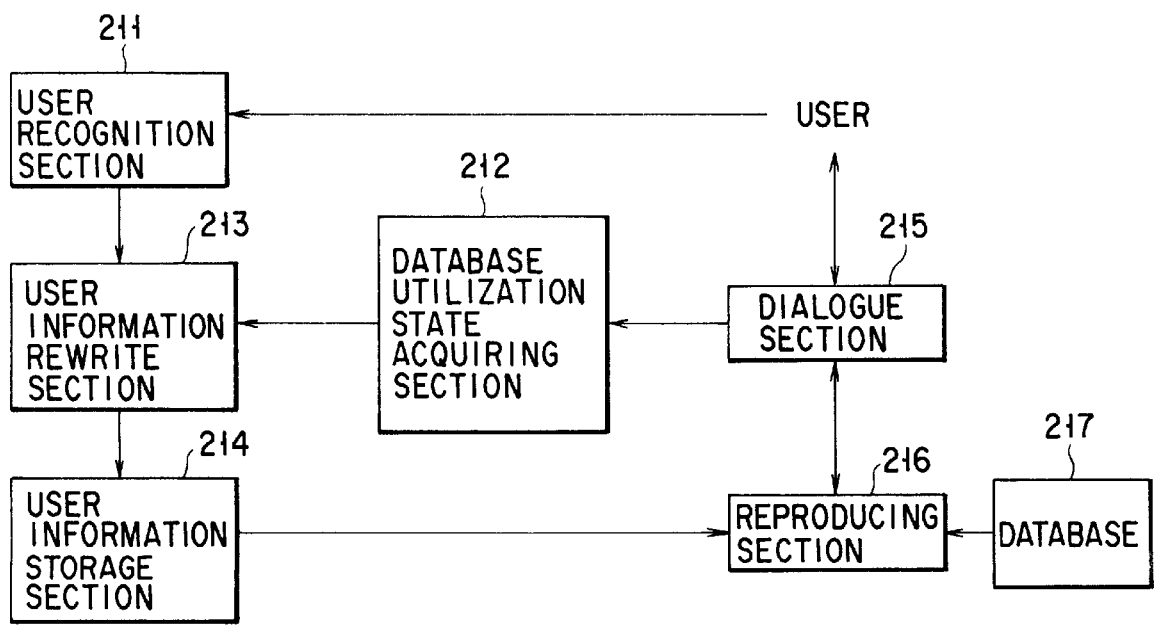
FIG. 10 is a block diagram showing a database system according to still another embodiment of the present invention.

This embodiment is associated with adaptive control of link information. FIG. 10 shows the arrangement of still another embodiment. This is a system for automatically forming a database structure, which is easy for the user to use, by checking how the user uses a database.

Referring to FIG. 10, a user recognition section 211 checks the identity of the current user. Various schemes may be applied to this recognition section. According to the simplest scheme, the user inputs user ID information to inform the system of his/her identity before he/she uses the system. In this case, a password may be set to prevent third parties from performing operations by using the ID information. In another scheme, a fingerprint recognition means is arranged at a main switch so that the identity of the user can be automatically determined when he/she turns on the switch. In still another scheme, an image of the face of a user is input, and the user is specified by an image recognition technique. A database utilization state acquiring section 212 acquires information indicating the frequency of access to a specific link as the system is used by the user, and information indicating the period of time during which a specific node is reproduced. A user information rewrite section 213 forms user information on the basis of these pieces of information, and stores the information in a user information storage section 214. A dialogue section 215 inputs a user request to browse the database to the system. A reproducing section 216 reads out necessary information from a database 217 in accordance with the user request obtained from the dialogue section 215, and reproduces the information. At this time, the reproducing section 216 also refers to information from the user information storage section 214.

Various types of information acquired by the database utilization state acquiring section 212 and various forms of user information formed therefrom are conceivable. According to a simple form of information, the frequency of use of each link is acquired for each user, and the association degree of a link exhibiting a high frequency of use is set to be high, while the association degree of a link exhibiting a low frequency of use is set to be low. The association degree of a link represents the strength of connection between two nodes connected to each other via the link. When the frequency of use of a link becomes extremely low, the link may be removed.

According to a more complicated form, information indicating the reproduced states of nodes, e.g., the period of time during which a specific node is reproduced, may be acquired in addition to the frequency of use of each link, and the association degree of each link is set to reflect such information. According to this form, a new link can be formed in accordance with user's manner of using the links. Assume that the flow of browsing, e.g., node A→node B→node C, frequently occurs, and the reproduction time of the node B is very short. In this case, it is determined that the user wanted to access the node C from the node A, and a new link extending from the node A to the node C is formed, as shown in FIG. 11.

As user information, information including not only the association degree of a link but also information about a node itself is also conceivable. For example, the importance of a given node can be determined from the average reproduction time of the node when the user accesses the node. When a node whose importance is not very low to the user is not accessed much by the user, a link with the node is automatically formed, or access to the node is urged so as to make the user notice the presence of the node.

FIG. 12 shows the arrangement of still another embodiment. This system allows the user to create a database structure by himself/herself. The embodiment is similar to the seventeenth embodiment except for the following point. In the seventeenth embodiment, the system automatically creates a database structure suitable for the user. In this embodiment, however, the user can create a desired database structure by himself/herself.

Referring to FIG. 12, the system recognizes the identity of the user through a user recognition section 301. The user inputs a request to the system via a dialogue section 304. In response to a request to form a link or node which can be seen by only the user, or a request to form a link or node which cannot be seen by the user, a user information rewrite section 302 stores user information in a user information storage section 303 while referring to structure information in a database 305. When the user inputs a request to reproduce a database, a reproducing section 306 creates a database structure, which can be seen by the user, from the structure information in the database and information in the user information storage section 303, and reproduces the database on the basis of the database structure in accordance with the user request sent from the dialogue section 304.

FIG. 13 shows an arrangement of a system capable of forming empty nodes.

A dialogue section 505 receives a request from the user and provides the user with various information required for a dialogue. More specifically, the dialogue section 505 is constituted by an output means such as a display and an input means such as a pointing device, e.g., a mouse or a tablet, or a keyboard. A database 504 serves to store video/audio information associated with nodes, together with the attribute information of the nodes, link information between data, and group information. Although various storage media are conceivable, it is preferable that large-capacity data such as video/audio data be stored in an optical disk, and other information which tends to be frequently accessed be stored in a RAM, a hard disk, or the like.

In general, the nodes of a hypermedia database are constituted by nodes having not only data such as dynamic picture data, still picture data, and audio data but also various attribute data. An empty node forming section 501 can form a node constituted by only attribute data (no attribute data in a special case) without main data such as dynamic picture data, still picture data, or audio data. In this case, an empty node can be formed without using existing data, and can also be formed by removing data such as dynamic picture data, still picture data, or audio data from a normal node.

A link forming section 503 links nodes, similar to a general hypermedia database. In this system, a link can also be connected to an empty node. If only a link source is designated without designating a link destination, it is determined that an empty node is formed at the link destination, and control is passed to the empty node forming section 501, thereby urging the user to form a proper empty node.

An empty node changing section 502 adds data such as dynamic picture data, still picture data, or audio data to an empty node, in the database, which is formed by the above two means, thereby changing the empty node into a normal node. In practice, an empty node can be changed into a normal node by only writing an address with respect to the attribute data of the empty node. That is, data such as dynamic picture data, still picture data, or audio data need not always be added. As is apparent, only an attribute value may be changed.

A control section 506 controls communications between the above three database control sections 501, 502, and 503 and the dialogue section 505, and controls these sections.

The flow of processing in this system will be described next.

A method in which the user creates a desired link structure by himself/herself using empty nodes will be described first.

The user selects link structure creation processing to designate a link structure. The user further selects a mode for setting an empty node at an arbitrary position on a display so as to create a data structure on the display. Upon selection of this mode, the user designates coordinates on the display by inputting corresponding data through a keyboard, or designates a position on the display by using a point device (e.g., a mouse or a tablet). With this operation, an icon representing an empty node is displayed at the designated position. By designating positions on the display in this manner, the number of empty nodes required by the user can be set at desired positions on the display.

The above operations are performed in the block diagram shown in FIG. 13 in the following manner. When the user performs designation by using the input means, a corresponding request is input to the system via the dialogue section 505, and the control section 506 controls the respective blocks in accordance with this request. When the user designates positions on the display while the mode for setting empty nodes is selected, the empty node forming section 501 forms empty nodes. Assume that the attribute data of each node and data such as dynamic picture data, still picture data, or audio data corresponding to the node are recorded on different storage areas. In this case, an empty node can be easily formed by changing the attribute data of the node into attribute data in which the contents of address data corresponding to the data such as dynamic picture data, still picture data, or audio data are NUL. When the attribute data of a node is to have an attribute indicating whether the node is an empty node, an empty node can be easily formed by forming attribute data having an attribute indicating that the node is empty. In any case, an empty node can be formed as a node in which attribute data exists in practice, but data such as dynamic picture data, still picture data, or audio data corresponding to the node does not exist in practice.

When icons representing the nodes are arranged on the display, the user selects a mode for linking to allow the system to link the icons of the nodes displayed on the display. The positions of the links can be designated by the same method as that of designating the positions of the empty nodes.

The link forming section 503 serves to link nodes, similar to a general hypermedia database. In this system, the link forming section 503 can link empty nodes as well as normal nodes. When a link is designated by the user, and two empty nodes which are to be linked are determined, the link forming section 503 specifies empty node attribute data corresponding to the two empty nodes among all the empty node attribute data recorded on the database 504. The link forming section 503 then writes addresses, at which the attribute data of the respective nodes are recorded, in link designation data addresses in the attribute data of the nodes. Furthermore, in a system which independently manages link information and node attribute data, pieces of link information are written independently of the attribute data. With this operation, the empty nodes can be linked.

Assume that in designating a link destination, the user designates a portion which is not displayed on the display. In this case, the link forming section 503 generally sends a corresponding signal to the control section 506. The control section 506 determines an error, and sends an instruction to the dialogue section 505 to output a message for urging the user to perform an input operation again. Alternatively, when a portion which is not displayed is designated as a link destination, it may be interpreted that the link destination is an empty node which is not displayed on the display. In this case, the control section 506 immediately outputs an instruction to the empty node forming section 501 to form a new empty node. The empty node forming section 501 then forms only node attribute in the database 504 by the above-described procedure. In addition, the link forming section 503 writes the addresses of the new empty node and an empty node to which the new empty node is to be linked in the link destination data addresses in the attribute data of the respective empty nodes. With the above processing, formation of an empty node and of a link can be performed at once.

The above description is associated with the method of creating a link structure constituted by only empty nodes. However, a link structure may be constituted by using both empty nodes and normal nodes including data such as dynamic picture data, still picture data, or audio data.

Such a link structure can be created when the user selects a mode for setting normal nodes instead of the mode for setting empty nodes. When this mode is selected, the user can select normal nodes to be incorporated in a link structure. The selected nodes can be set at arbitrary positions on the display. When the selected nodes are set on the display, node attribute data in which the addresses of data such as dynamic picture data, still picture data, and audio data written in the selected nodes are written are formed.

In addition, an empty node can be formed by deleting only data such as dynamic picture data, still picture data, or audio data from a normal data in an already created link structure. When the user gives an instruction to that effect via the dialogue section 505, data such as dynamic picture data, still picture data, or audio data of the designated node is deleted to leave only the attribute data of the node, thereby changing the normal node into an empty node. In this case, instead of actually deleting the data such as dynamic picture data, still picture data, or audio data, the address of the data such as dynamic picture data, still picture data, or audio data in the attribute data of the node may only be set to be NUL.

In the link structure including empty nodes formed by the above processing, the user can change an empty node into a normal node by writing data such as dynamic picture data, still picture data, or audio data in the empty node. When the user designates an empty node in the link structure, and data such as dynamic picture data, still picture data, or audio data to be written in the empty node, the empty node changing section 502 writes an address, at which the data such as dynamic picture data, still picture data, or audio data to be written in the empty node is recorded, in the corresponding node attribute data recorded on the database 504. With this processing, the data such as dynamic picture data, still picture data, or audio data is written in the empty node to change the empty node into a normal node. The empty node changing section 502 can also change attribute data recorded on the database 504 when the user instructs a change of another attribute of the empty node.

Processing to be performed when the user creates a desired link structure by using a link structure of empty nodes, which is prepared in the system in advance will be described next.

If it is cumbersome for the user to form a link structure from the beginning, or a basic link structure is to be created, the user may use the prototypes for link structures which are prepared in the system. More specifically, basic link structures constituted by empty nodes are recorded on the database 504. The prototypes for the basic link structures include a linear structure, a tree structure, a radial structure, a ring structure, a bus type structure, and the like.

In addition, a structure in which empty nodes are sequentially formed may be prepared as a special linear structure. Assume that an empty node B is linked to a normal node A. When video and audio data are set in the empty node B, an empty node C having the same attribute data as that of the empty node B, or having attribute data which has undergone a predetermined change (e.g., the numerical portion of a file name has been incremented by one) is formed. This empty node C is added behind the node B. Similarly, an empty node D is formed by setting video and audio data in the empty node C. That is, nodes constituting a linear structure can be infinitely formed. Furthermore, a structure created by the user may be stored as a prototype to be used afterward.

In creating a desired link structure, the user designates a structure similar to the desired structure via the dialogue section 505. In this case, a list of link structures registered as prototypes may be displayed so that the user can select a link structure by using a pointing device or the like while seeing the link structures. Some structures of the same type are constituted by different numbers of nodes. For example, link structures as tree structures may become different link structures depending on parameters designating, e.g., the depth of a tree and a binary or ternary tree.

A method of designating a structure and parameters (e.g., the number of nodes) can be effectively used. When the user selects one prototype, only the selected link structure prototype is displayed on the display. In this case, the empty node forming section 501 forms attribute data for empty nodes having the same structure as that of the designated link structure prototype on the database. In these node attribute data, the address of data such as dynamic picture data, still picture data, or audio data is set to be NUL, and the addresses of the attribute data of empty nodes at the destinations of links formed in accordance with the link structure prototype are written in the link destination addresses. By designating a prototype in this manner, the same link structure as that the link structure prototype can be created without performing any other operations.

Assume that the user wants to change the link structure created in this manner. In this case, the user can easily change the link structure into a desired link structure by designating nodes and links to be omitted or added. A link can be omitted by omitting the link destination address in the attribute information of a corresponding node. An empty node can be omitted by omitting the attribute information of the empty node and the link destination address, in the attribute information of another node, which corresponds to the empty node to be emitted. Links and nodes can be added by the same operations as those of forming links and nodes. Normal nodes can also be added, as well as empty nodes. During creation of a link structure, another link structure prototype may be selected and incorporated in the link structure. Assume that a link structure which the user wants to create is not similar to any of the prototypes registered in the system. Even in this case, if a structure partly similar to the desired structure is registered in the system, only the similar portion can be used as a prototype.

In a link structure created by using a link structure prototype in this manner, an empty node is changed into a normal node by writing data such as dynamic picture data, still picture data, or audio data in the empty node by the same operation method as described above.

A case wherein a link structure including empty nodes is not created by the user but is determined in advance will be described next.

When a link structure including empty nodes is given, the main operation performed by the user is to change empty nodes into normal nodes by writing data such as dynamic picture data, still picture data, and audio data in the empty nodes. Such an operation is the same as the above-described operation of writing data such as dynamic picture data, still picture data, and audio data in empty nodes. This operation will be described in more detail below.

First of all, the user must prepare video data to be written in an empty node. This video data may be input by any means. It is preferable that the data be finally recorded on the database 504. In this case, when reproduction of the data such as dynamic picture data, still picture data, or audio data written in the node is instructed, the data can be immediately read out from the database 504 and reproduced. However, data written in a node may not be recorded on the database 504 depending on the capacity of the database 504 and the like. In this case, the data are recorded on another external recording unit.

The user selects an empty node. If there are a plurality of types of link structures including the selected empty node, the user must select a link structure first. In this case, names attached to the link structures or the link structures are displayed, and the user designates and selects one of the displayed link structures. In selecting an empty node in a selected link structure, the user designates a name attached to an empty node or directly designates a displayed empty node of the link structure by using a pointing device or the like.

Upon designating an empty node, the user designates data such as dynamic picture data, still picture data, or audio data to be written in the empty node. These data are also designated by designating names attached to the data or selecting corresponding icons. If the number of data such as dynamic picture data, still picture data, and audio data is large, and it is difficult to directly find desired data within a short period of time, designation may be combined with searching. For example, a keyword may be input to display a list of associated data such as dynamic picture data, still picture data, or audio data, and the user may designate data from the list. If data written in another node is to be used, the data can be found by a browsing operation using a link.

When data to be written in the empty node is designated, an address at which data such as dynamic picture data, still picture data, or audio data is recorded is read out and written in the attribute of the empty node. The empty node is changed into a normal node by only this operation, and desired data such as dynamic picture data, still picture data, or audio data is written in the node. Identical data can be written in different nodes by only writing corresponding address data in the attribute data of the respective nodes. Therefore, a plurality of identical data such as dynamic picture data, still picture data, or audio data need not be recorded on the database, and the capacity of the database can be efficiently used.

If data such as dynamic picture data, still picture data, or audio data to be written in an empty node is recorded on an external recording unit, data indicating this fact must be written in the attribute data of the node. When reproduction of the node is requested, and it is found that the data such as dynamic picture data, still picture data, or audio data corresponding to the node is recorded on the external recording unit, the control section 506 outputs a message to the user to prepare for the use of the external recording unit in which the data is recorded. If the external recording unit on which the data is recorded is set in a ready state in advance, access to the data may be immediately started.

The effects of the present invention will be described next by giving a detailed description of an application provided under this environment. The system described below is an instructor support system used in various types of sports clubs. It is taken for granted that the skill of a person in a sport can be effectively improved by objectively watching his/her form. In some sports schools, students are advised to watch their forms by using VTRs and the like to effectively correct the forms. However, a VTR is not suitable for repetitive reproduction of the same scene or quick search for a desired picture, and hence is not very useful. A disk-based video recorder allows random access. Therefore, such a video recorder can be used for this purpose with high efficiency. Currently, multimedia systems and hypermedia systems based on disk media have been studied in various fields. Although the existing systems cannot be used for the above need without posing any problems (i.e., the systems are very expensive at present), such systems are suitable for the above purpose.

In order to meet such a need, operability must be considered first. Consider, for example, kinds of pictures to be recorded in a tennis school. For one student, pictures of various kinds of shots, e.g., serves, receives, strokes, and volleys, must be recorded. In addition, serves, for example, include various kinds of serves. Consequently, a considerable number of pictures are taken for one student. That is, the number of pictures increases with an increase in the number of students. Therefore, an instructor who is not an expert in a video database cannot handle the system without an environment allowing efficient management/search of/for these pictures.

The present invention is one method of solving these problems. More specifically, a link structure allowing easy management/search, from which only video data are removed, is formed in advance. For example, the link structure is formed such that a picture of each shot of a given student can be easily found according to his/her name, a picture of a given shot of every student in a class can be easily found according to the name of the shot, and a picture of a model shot can be easily found according to every picture. In this case, no video data are recorded. Video data of the students may be recorded during lessons. The video data can be stored in empty nodes by simple operations. Since the structure for a search operation is prepared in advance, the system can be used immediately after video data are recorded. In this case, the tennis instructor can use pictures without being conscious of the database structure (especially, links). All the instructor must do, other than to take pictures, is to input the names of students. If one person can perform this operation, no other person in the tennis school need to perform it.

This system can be applied to not only tennis and other sports but also various kinds of education. In any case, the system can be used as one tool for education without being conscious of a database, and hence is very attractive.

Figure 14:
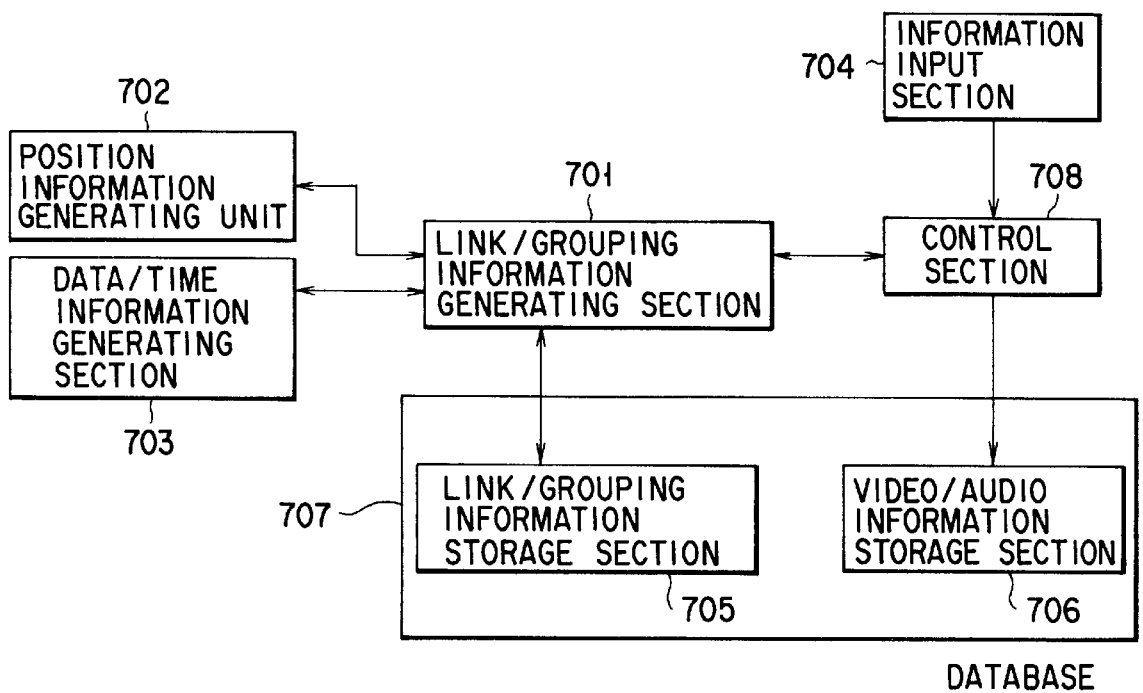
FIG. 14 is a block diagram showing a database system according to still another embodiment of the present invention.

FIG. 14 shows a database which can automatically perform grouping and linking with respect to input data. An information input section 704 serves to input data such as dynamic picture data, still picture data, and audio data. For example, the information input section 704 is a line input section constituted by an image pickup section for inputting video data, a microphone for picking up sounds, a musical instrument, and the like. A date/time information generating section 703 incorporates a timepiece and generates information indicating the date and time when information is input. A position information generating unit 702 generates information indicating the position and place where information is recorded. For this operation, for example, a GPS technique used for a car navigation system can be used. A link/grouping information generating section 701 automatically performs operations such as grouping and linking with respect to input information on the basis of information obtained by the date/time information generating section 703 and the position information generating unit 702. A database 707 serves to store input information together with link/grouping information (including attribute information). A control section 708 controls the respective blocks described above.

The flow of processing will be described in detail below. When information is input, position information and date/time information are generated by the position information generating unit 702 and the date/time information generating section 703. The link/grouping information generating section 701 refers to the link/grouping information of already stored information so as to determine a specific group and link to which the new input information belongs and is connected. For example, this determination is performed in the following manner.

Figure 15:
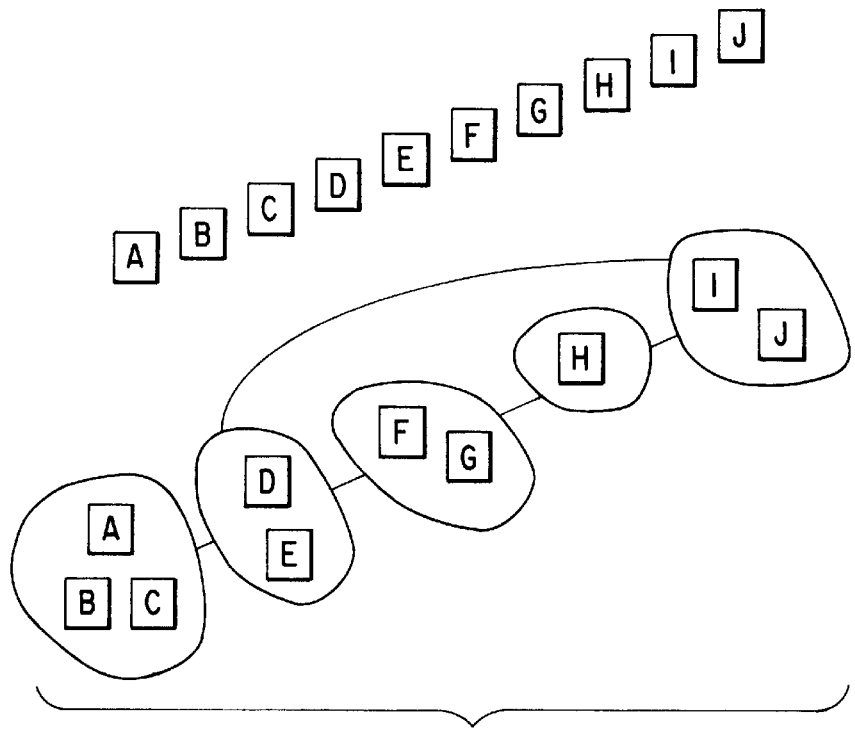
FIG. 15 is a view showing an example of grouping/linking.

Assume that input information is a still picture. The input still picture is arranged in the order of photographing times. Still pictures which are adjacent to each other in this order and taken at photographing positions near to each other are considered to belong the same group. If this operation is performed with respect to all still pictures, still pictures taken at places near to each other are classified into groups, and the groups are arranged time-serially. That is, group information and information about links (indicating that groups are arranged time-serially) between the groups can be obtained. In addition, a link is formed between groups taken at photographing positions close to each other, even if they are not adjacent to each other in terms of time. This link indicates that the photographing positions are near to each other. With the above processing, grouping and linking are performed, as shown in the lower part of FIG. 15.

According to this embodiment, the following effects can be expected. Considering a case wherein still pictures are stored by an electronic means, arrangement of the still pictures is indispensable. However, some users may consider such an operation to be cumbersome, and forget about arranging photographed pictures. If dynamic pictures are handled in this manner, they may still be useful. If, however, a large number of still pictures are stored without being arranged, they become useless. According to this embodiment, since the system automatically arranges pictures to a certain extent, the load on the user is reduced.

If the system further includes a picture analyzing means so as to reflect a picture analysis result on grouping and linking, a more suitable environment can be realized.

In an information recording/reproducing apparatus, especially a video recording/reproducing apparatus, one of a plurality of operation means has been conventionally operated for one of a plurality of operation targets in the following method. One of a plurality of operation targets is selected, and one of a plurality of operations which is to be performed with respect to the operation target is selected. Alternatively, after one of a plurality of operation means is selected, an operation target for which the operation means is operated is selected.

Figure 16:
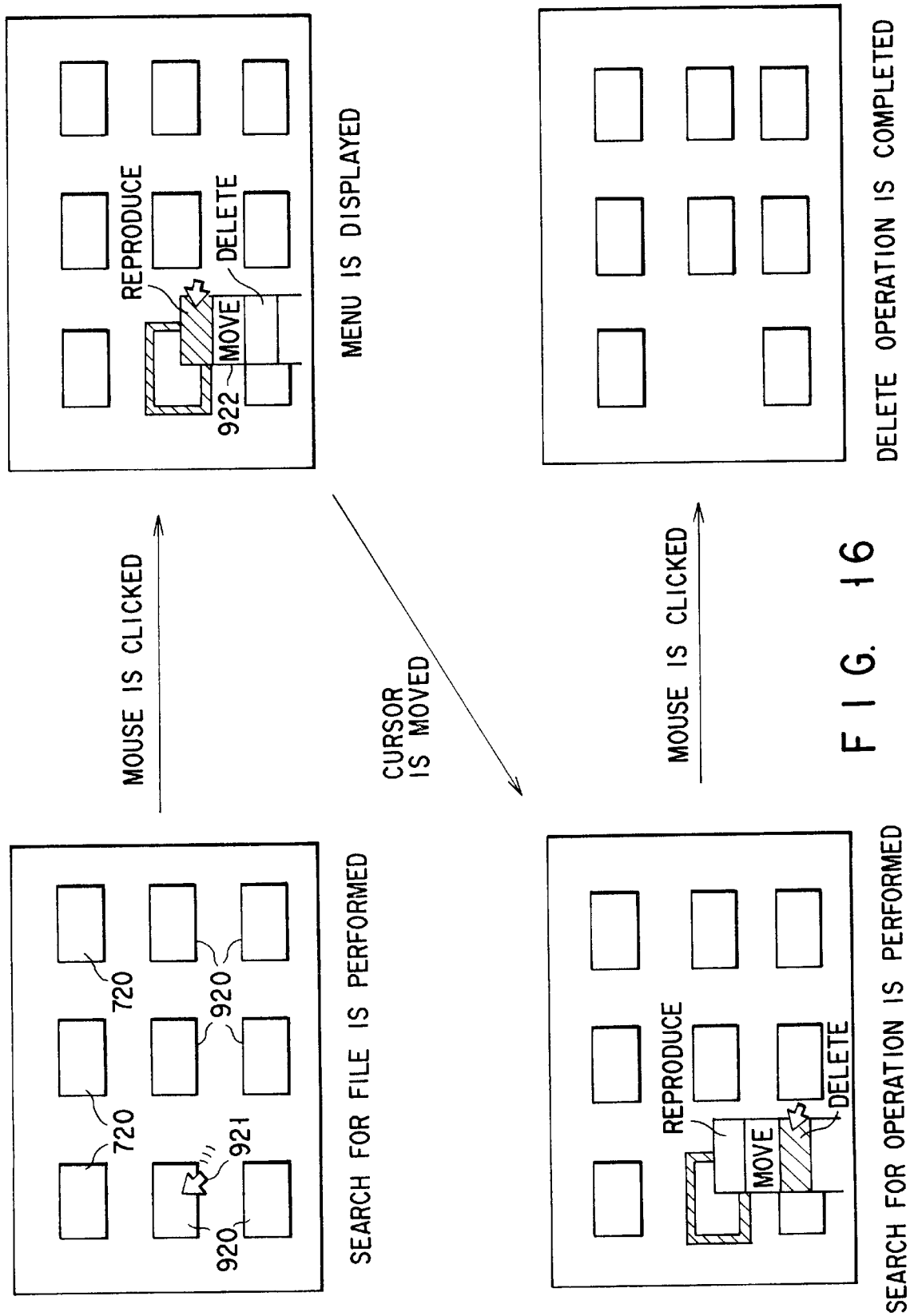
FIG. 16 is a view of screens showing an operation procedure for selecting and reproducing one of a plurality of still picture files.

This method will be described in more detail below. FIG. 16 shows an operation procedure for selecting and reproducing one of a plurality of still picture files. First of all, the user selects one of the files by using a mouse as a pointing device. A plurality of still picture files 920 are displayed, as a list of reduced pictures or icons, on the screen. When the user moves the mouse, a cursor 921 moves. When the user clicks the mouse, a still picture file corresponding to the cursor position is selected, and a menu 922 is displayed at the position. The menu 922 displays a list of operations such as "reproduce", "delete", and "move". The user further moves the cursor with the mouse and clicks the mouse at a position corresponding to a desired operation, thereby executing the operation.

In this case, an operation instruction is selected after an operation target is selected. However, this selection order may be reversed. That is, an operation target may be selected from a file list after a desired operation is selected from an operation menu. In any case, the user follows the following procedure: "search"→"confirm selection"→"search"→"confirm selection".

In this case, "search" is an operation of searching for one of a plurality of choices. That is, "search" indicates that the user searches for a target by his/her eyes or moves the cursor to the position of a desired target. "Confirm selection" indicates that the user confirms a selected target by clicking the mouse or pushing a button.

In another conventional operation method, when the user searches for a target by moving the cursor, and clicks a mouse twice at the position of a desired target, the target is immediately reproduced. In this method, selection of an operation target and execution of an operation are simultaneously performed. That is, the procedure in this method is simplified as compared with that in the above case. The above method can be effectively applied to a case wherein there is only one operation instruction with respect to an operation target, or one of operation instructions is to be performed by a simplified procedure.

Figure 17:
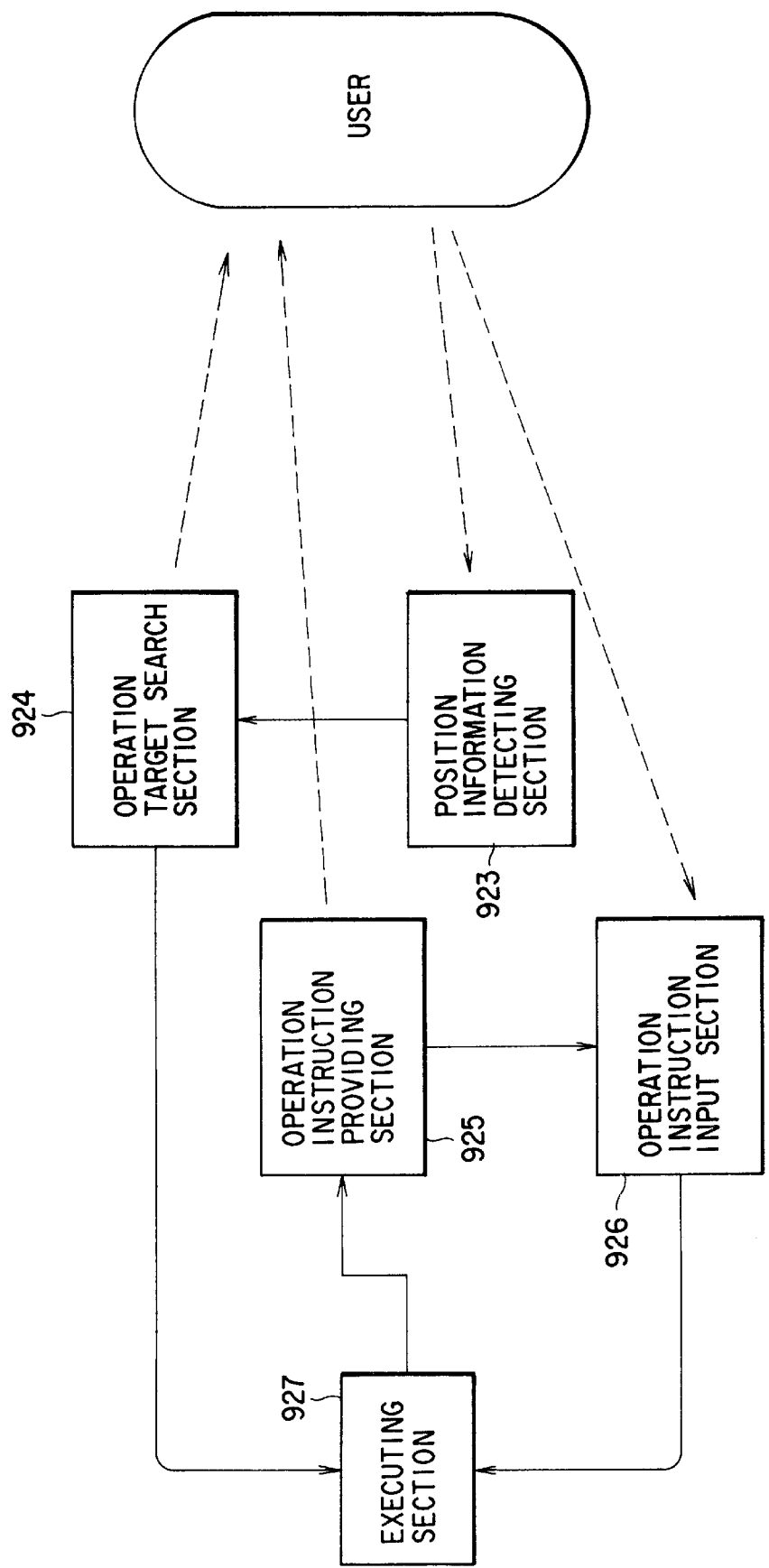
FIG. 17 is a block diagram showing a method of simplifying a procedure for issuing a plurality of operation instructions and an operation apparatus.

An operation method and apparatus which can simplify procedures for all of a plurality of operation instructions will be described below with reference to FIG. 17. FIG. 17 shows the arrangement of still another embodiment. The operation apparatus is constituted by a position information detecting section 923, an operation target search section 924, an operation instruction providing section 925, an operation instruction input section 926, and an executing section 927.

The position information detecting section 923 detects the movement of a device which is held by the user to perform an operation. For example, the position information detecting section 923 is a means for detecting the movement of a device, e.g., a mouse, within a plane, or a means for detecting the movement of a device in a space.

The operation target search section 924 is a means for selecting an operation target (a file or an icon) on the basis of output information from the position information detecting section 923. For example, the operation target search section 924 moves the cursor upon movement of a device, and performs reverse display of a file at the cursor position, or turns on an indicator near the file.

The operation instruction providing section 925 provides the user with the types of operations which can be performed with respect to an operation target. The operation instruction providing section 925 is a function name displayed near each operation button like a general remote controller, or information displayed on a liquid crystal display unit.

The operation instruction input section 926 is a means which is used by the user to select and input one of the operations provided by the operation instruction providing section 925. The operation instruction input section 926 is constituted by function buttons, a touch panel stacked on a liquid crystal display unit, or the like. A characteristic feature of this operation apparatus is that when an operation is requested by the operation instruction input section 926, the operation target temporarily selected by the operation target search section 924 is confirmed at the same time.

As compared with the operation procedure in the conventional method, the operation procedure in this method can be simplified as follows: "search"→"search"→"select".

Figure 18:
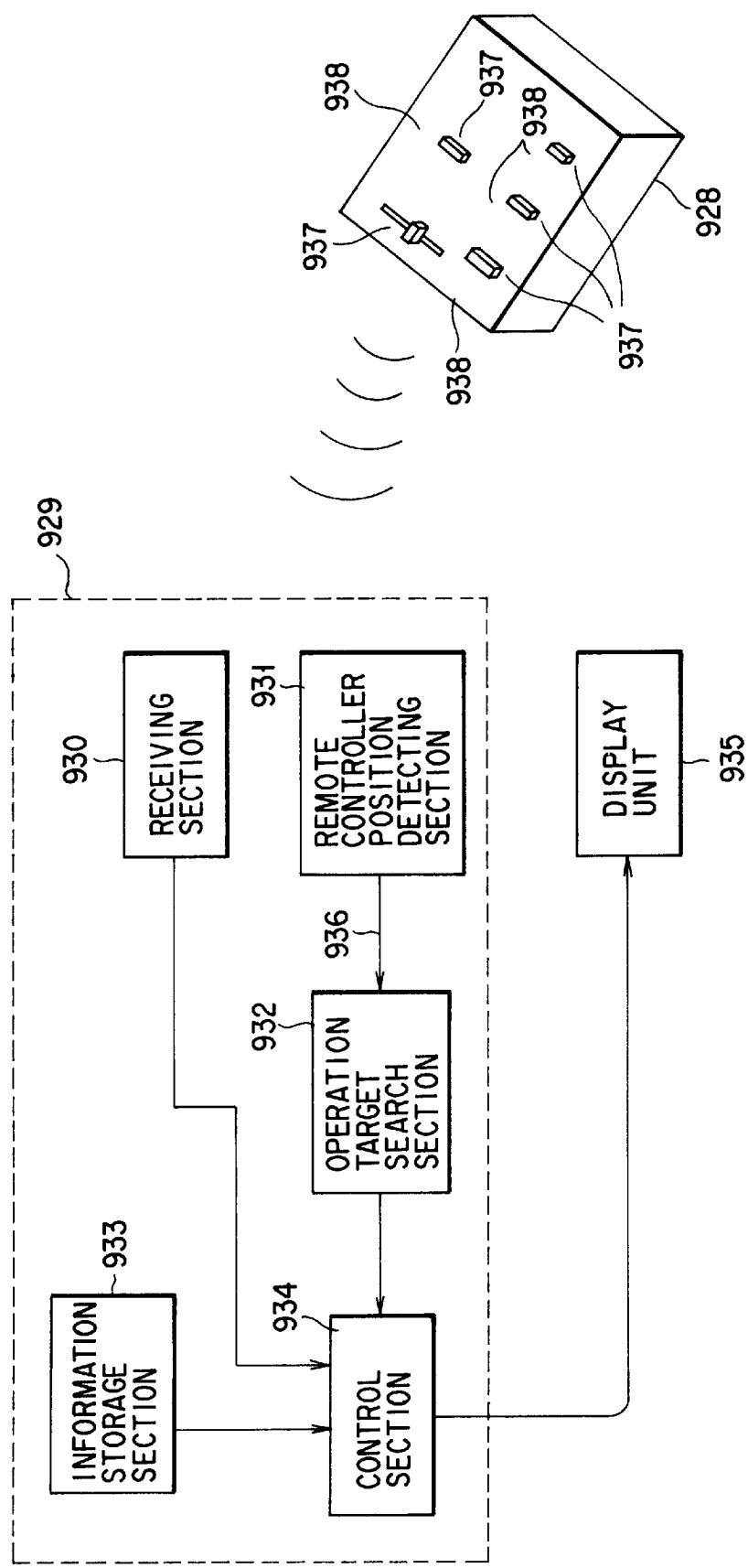
FIG. 18 is a block diagram showing an operation apparatus which can select arbitrary files from a plurality of dynamic picture files, a plurality of still picture files, and a plurality of audio files, and perform operations such as reproduction with to the selected files.

A more detailed embodiment will be described below. FIG. 18 shows the arrangement of an operation apparatus designed to select an arbitrary file from a plurality of dynamic picture, still picture, and audio files and suitably perform operations such as "reproduce", "delete", "move", and "link".

An operation apparatus 928 is used while the user holds it with his/her hand, similar to a remote controller. In this embodiment, the operation apparatus 928 has almost the same arrangement as that of a general remote controller. However, the apparatus may be constituted by a liquid crystal display unit and a touch panel, as will be described later.

In addition, this operation apparatus includes a video information recording/reproducing apparatus main body 929 and a remote controller position detecting section 931. The remote controller position detecting section 931 detects infrared rays emitted from a remote controller through a position detecting element such as a PSD so as to detect the position of the remote controller. Remote controller position information 936 detected by the remote controller position detecting section 931 is sent to an operation target search section 932. The operation target search section 932 detects an operation target which can be temporarily selected.

A control section 934 reads out reduced image data from an information storage section 933 and displays it on a display section. The control section 934 displays a cursor in accordance with information obtained by the operation target search section 932. As a result, a file at a position corresponding to the cursor is emphasized by, e.g., changing the color around the file, thereby notifying the user of a specific file which can be temporarily selected. Therefore, the user can search for an operation target by moving the operation apparatus.

A function button 937 and a function display 938 are arranged on the operation apparatus. These components are equivalent to the operation instruction input section and the operation instruction providing section in FIG. 17, respectively. When the user depresses one button (e.g., the "reproduce" button) on the operation apparatus, a corresponding operation instruction signal is transmitted from the operation apparatus. In the main body, the signal is received by a receiving section 930 and supplied to the control section 934. The control section 934 executes the transmitted operation instruction with respect to a file located at the cursor position. In this case, data in the file at the cursor position is read out by the information storage section 933 to be reproduced.

Figure 19:
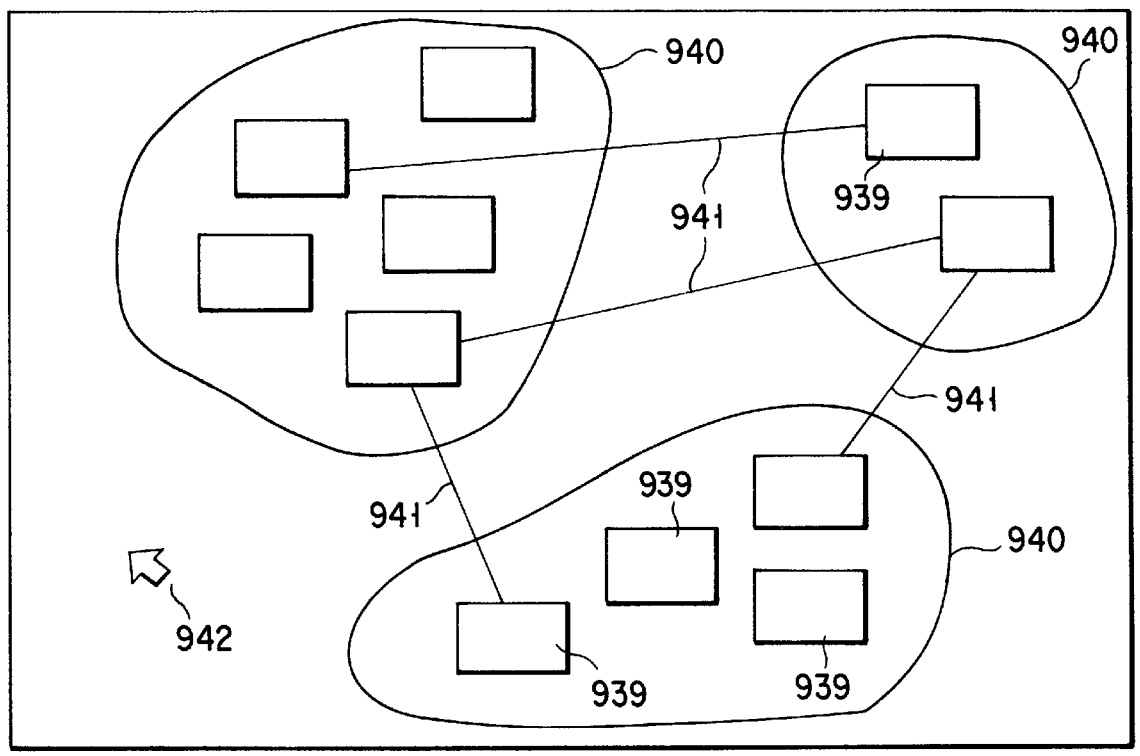
FIG. 19 is a view showing a screen on which a list of files is displayed.

A more specific example of the processing performed by the control section 934 will be described below. A list of files is now displayed, as shown in FIG. 19. Each file 939 is displayed as a representative image or a reduced image. A line 940 enclosing several files indicates that the files together form a group. A line 941 connecting files represents a link.

Figure 20:
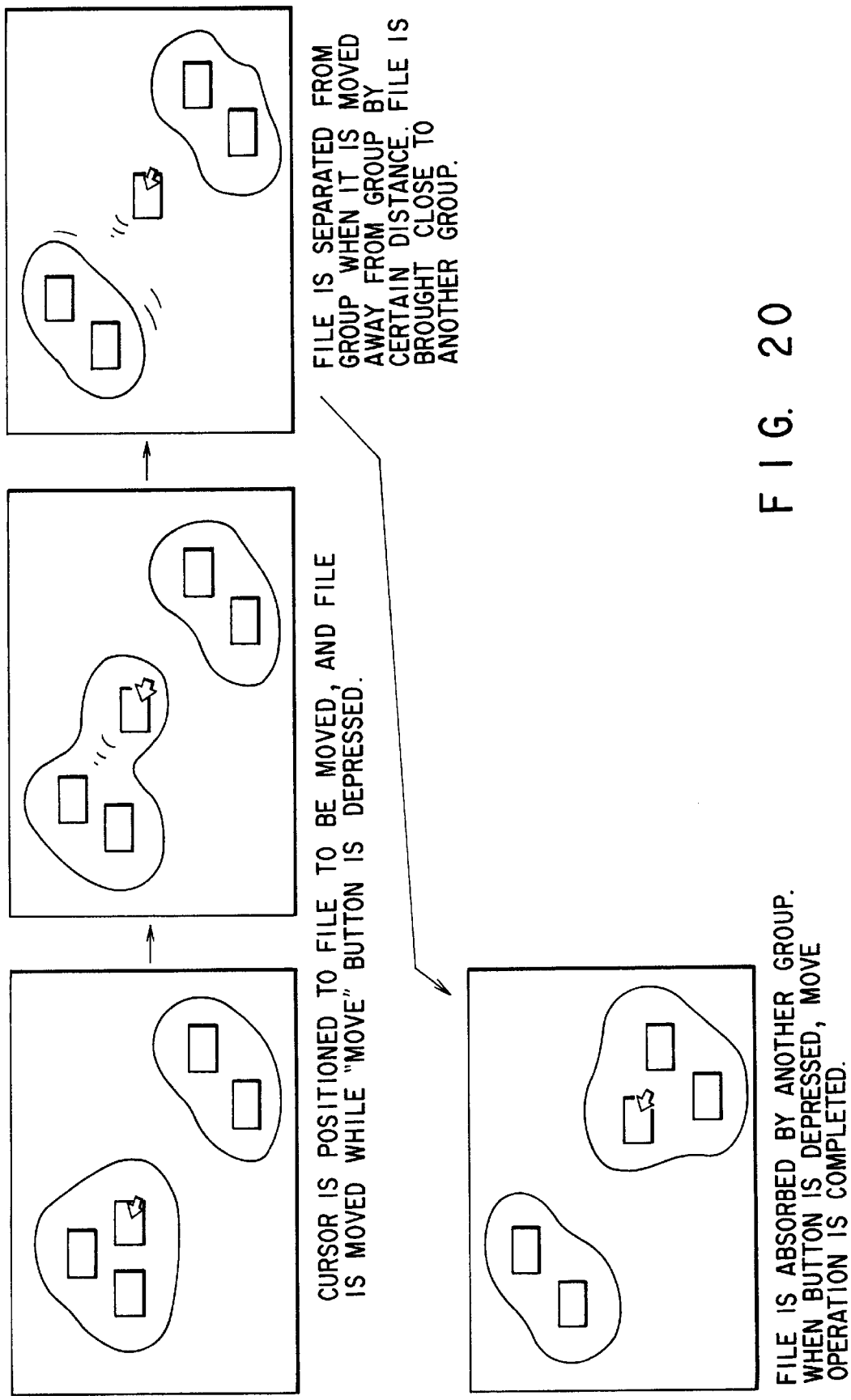
FIG. 20 is a view showing a state wherein a file is moved between groups.

Assume that the user moves the operation apparatus to move a cursor 942 onto a target file, and depresses the "reproduce" button. In this case, a file at the cursor position is reproduced. While the file is reproduced, "pause", "fast reproduction", "reverse reproduction", and the like can be performed like general video reproduction. When the operation is stopped, the initial state (list display) is restored. When the "delete" button is depressed, a file at the cursor position is deleted upon confirmation by the user. When the user moves the operation apparatus while depressing the "move" button, a reduced image of a file moves upon movement of the operation apparatus. When the user releases the button, the movement of the image is stopped. The system may be designed such that a file in a given group can be separated from the group by moving the file outside the line, and the file can be absorbed into another group by bringing the file near the group. With this system, movement of a file between groups can be easily performed (FIG. 20).

When the user moves the operation apparatus while depressing the "link" button, a link extends from a file which is located at the cursor position when the button is depressed, and is connected to a file which is located at the cursor position when the button is released. As described above, in order to perform one operation, the user is only required to depress a button once and move the operation apparatus once or twice. Therefore, the operation can be very efficiently performed. In addition, this system makes the user feel as if he/she were directly operating a target, thereby realizing a natural operation environment. Since an unnecessarily large number of mode states need not be set, the system is easy for the user to use.

Figure 21:
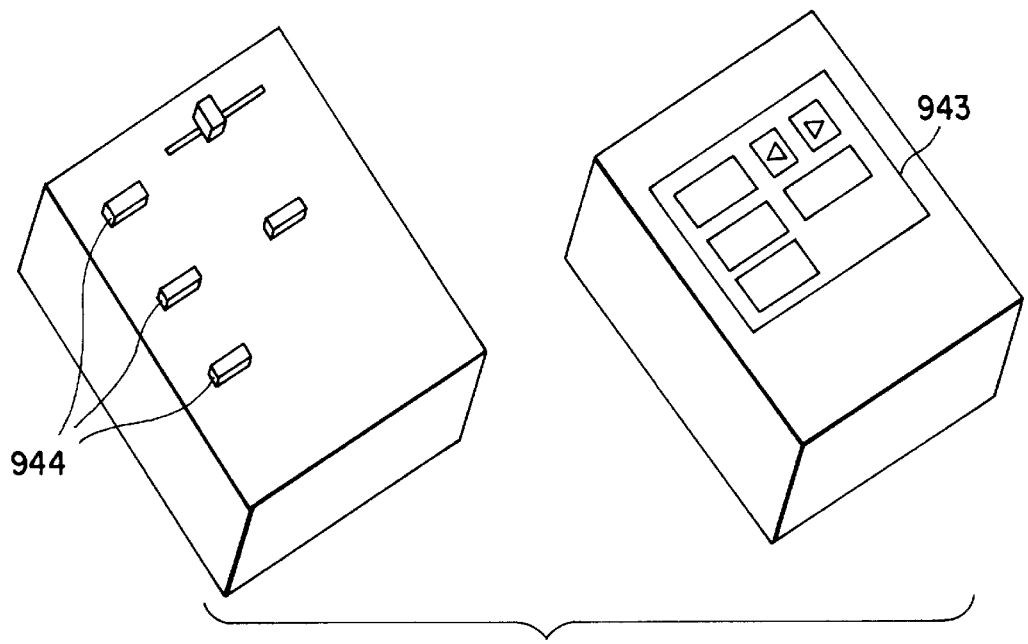
FIG. 21 is a schematic perspective view of a remote controller according to still another embodiment of the present invention.

FIG. 21 shows the outer appearances of operation apparatuses used in this operation method. The user operates these apparatuses while holding them with his/her hand, similar to a conventional remote controller. As described above, each operation apparatus needs to input movement information and an operation instruction. The following are means for inputting movement information:

(a1) detecting the moving amount of the apparatus by using an acceleration detector incorporated therein;

(a2) detecting light from a light-emitting portion incorporated in the apparatus by using a photodetector on a video recording/reproducing apparatus or a display unit, thereby detecting the position of the apparatus; and (a3) detecting the moving amount of the apparatus within a two-dimensional plane by detecting the rotation amount of a ball like a mouse.

The following are means for inputting an operation instruction:

(b1) depressing a button 944 to which a function is assigned;

(b2) depressing an operation instruction displayed on a liquid crystal display unit 943 stacked on a touch panel; and (b3) using both the means (b1) and (b2).

In the above embodiment, a combination of the means (a2) and (b1) is employed. However, other combinations may be considered.

If a combination of a touch panel and a liquid crystal display unit is used as an operation apparatus, an input error can be prevented by selectively displaying operation instructions which can be input at a given time point.

An operation environment more convenient for the user, which is realized by using this method, will be described next. In this dialogue environment, a remote controller has no button or necessary minimum buttons. Instead of depressing a button, the user designates an icon displayed on a liquid crystal display having a tablet with his/her finger or a pen to input an instruction. The remote controller incorporates a three-dimensional position sensor or a direction sensor to serve as a pointing device with respect to the display unit of the main body. A screen displayed on the liquid crystal display of the remote controller is adaptively controlled in accordance with the contents displayed on the main body screen, the cursor position, and other factors, thereby properly providing information required for the user. This dialogue environment will be described in detail below.

Figure 22:
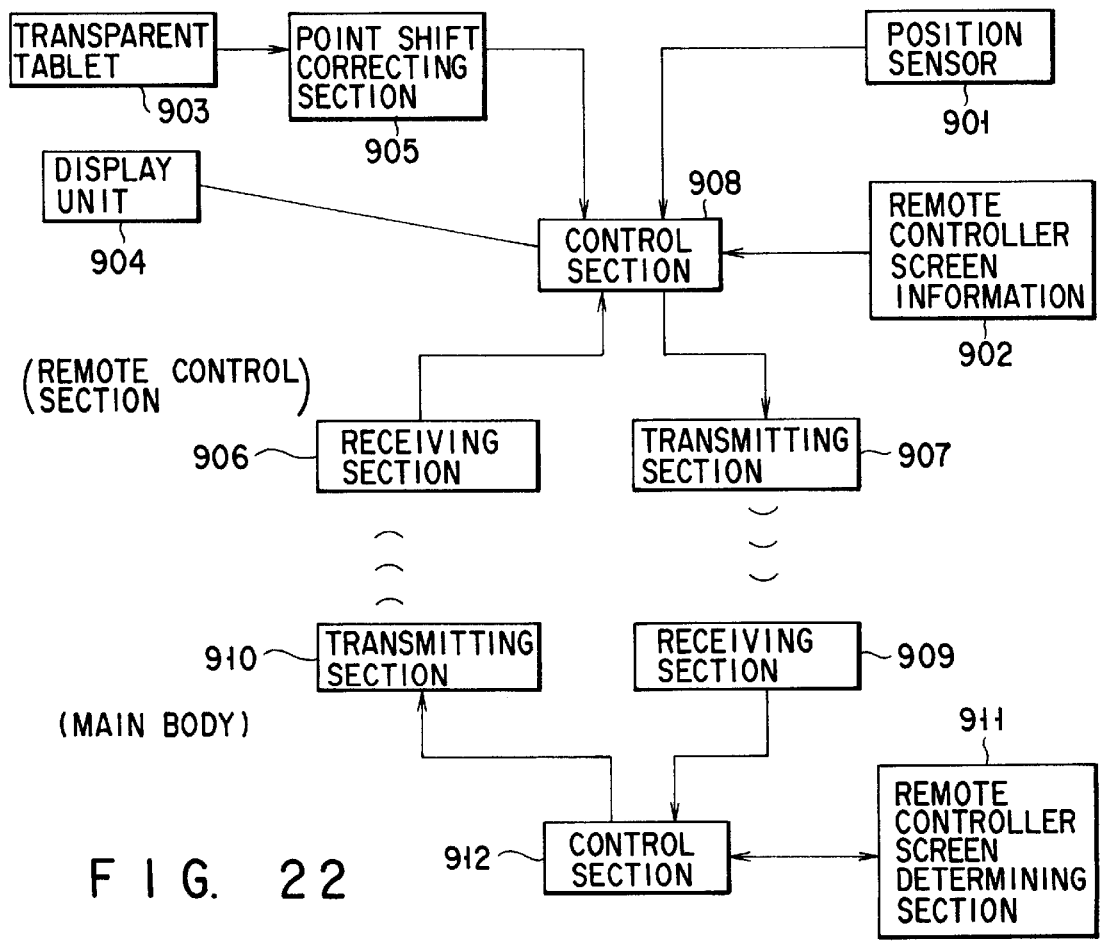
FIG. 22 is a block diagram showing a remote control system according to still another embodiment of the present invention.

FIG. 22 shows the arrangement of this dialogue environment. A remote control section has a position sensor 901 or a direction sensor so that a given point on the main body screen can be pointed when the user moves the remote controller. The corresponding position information is sent to the main body by a transmitting section 907, and is received by a receiving section 909 of the main body. In the main body, a remote controller screen determining section 911 determines a specific instruction, which can be currently executed from the remote controller, on the basis of the received information, and transmits a signal identifying the instruction to the remote control section via a transmitting section 910. Upon reception of this identification information via a receiving section 906, the remote control section displays a proper input screen by referring to information in a remote controller screen information 902. This screen is displayed on a display unit 904 on which a transparent tablet 903 is stacked. The user inputs an instruction by designating it on the transparent tablet 903 with his/her finger, a pen, or the like. In this case, if the remote controller moves inadvertently upon a "depressing" operation, the cursor may be shifted to designate a wrong object. In order to prevent this, a point shift correcting section 905 is arranged in the remote controller. More specifically, assume that the cursor has moved immediately before an operation, and the cursor had been located near a given point for a predetermined period of time or more. In this case, it is determined that the operation is intended to correspond to the point where the cursor had been located for the predetermined period of time or more. This prevents an operation error, e.g., erroneously designating an icon adjacent to a target icon, which is to be designated and operated, owing to a shake of a hand of the user.

Figure 23:
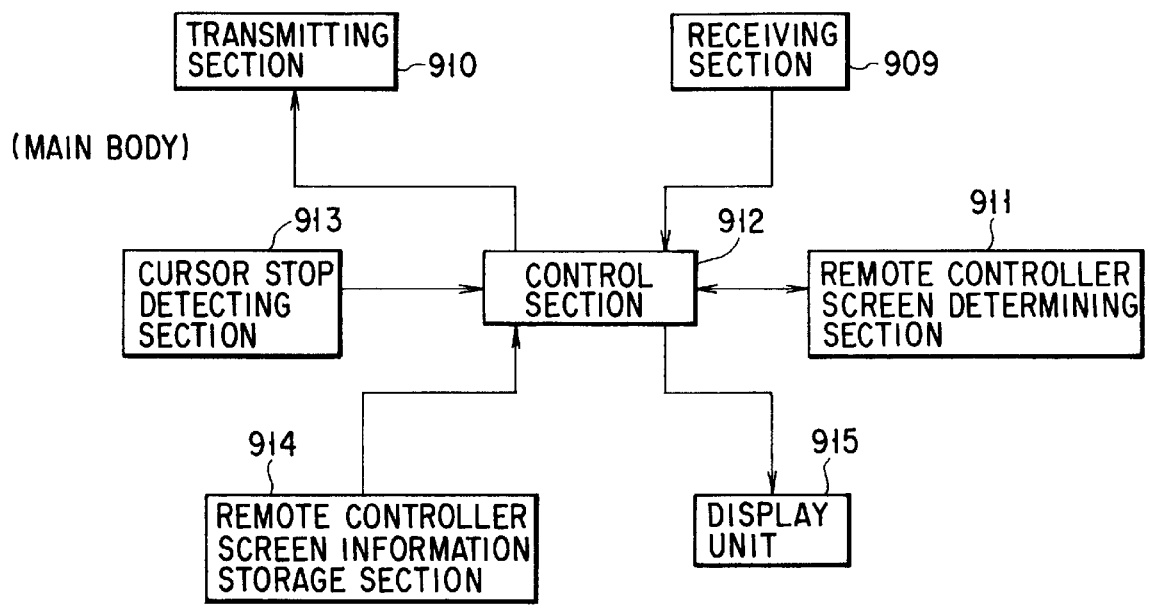
FIG. 23 is a block diagram showing the main body of another remote control system according to still another embodiment of the present invention.

In this dialogue environment, an operation target is selected from the display unit of the main body, and an operation corresponding to the target is selected from the display unit of the remote controller. For this reason, the user's sight axis inevitably moves around, resulting in a cumbersome operation. Therefore, still another embodiment (FIG. 23) further includes a mechanism for improving the operability. Assume that the cursor is located on an object for which a given operation can be performed, and hardly moves for a predetermined period of time. In this case, a cursor stop detecting section 913 detects this state. The main body receives the resultant detection information and causes a display unit 915 to display the same contents as those displayed on the display unit of the remote controller. In this case, the main body requires a remote controller screen information storage section 914 having the same contents as those of the storage section of the remote controller. Since identical screens appear on the display units of the main body and the remote controller, the user can perform an operation without shifting his/her eyes onto the remote controller.

The following effects can be obtained by this system. In a recent system having many functions, like a VTR, a remote controller or the like have many buttons. It is hard to say that such a remote controller is easy for many users to use. This is because proper correspondence between user's requests and required operations (buttons to be depressed) is difficult to establish. For example, in performing recording reservation in a VTR, data are sequentially input as follows:

"reservation start"→"date"→"channel"
"recording start time"→"recording end time"→"reservation set"

Setting buttons are prepared for the respective items, and the respective data must be set in the above order. Although it seems that there are a plurality of buttons which can be used for setting, only one of them can be used for setting (e.g., after the reservation start button is depressed, channel adjustment cannot be performed because the date setting mode is set). In general, this problem is solved by displaying, on a display unit, information indicating a current item to be set, or indicating the order of depression with numbers attached near the respective buttons of the remote controller. However, in order to drastically solve the problem, the system is preferably designed such that the user can depress only a button which can be operated at a given time point. Such a system can meet this requirement because only a button which can be operated can be displayed on the screen of the remote controller.

Figure 24:
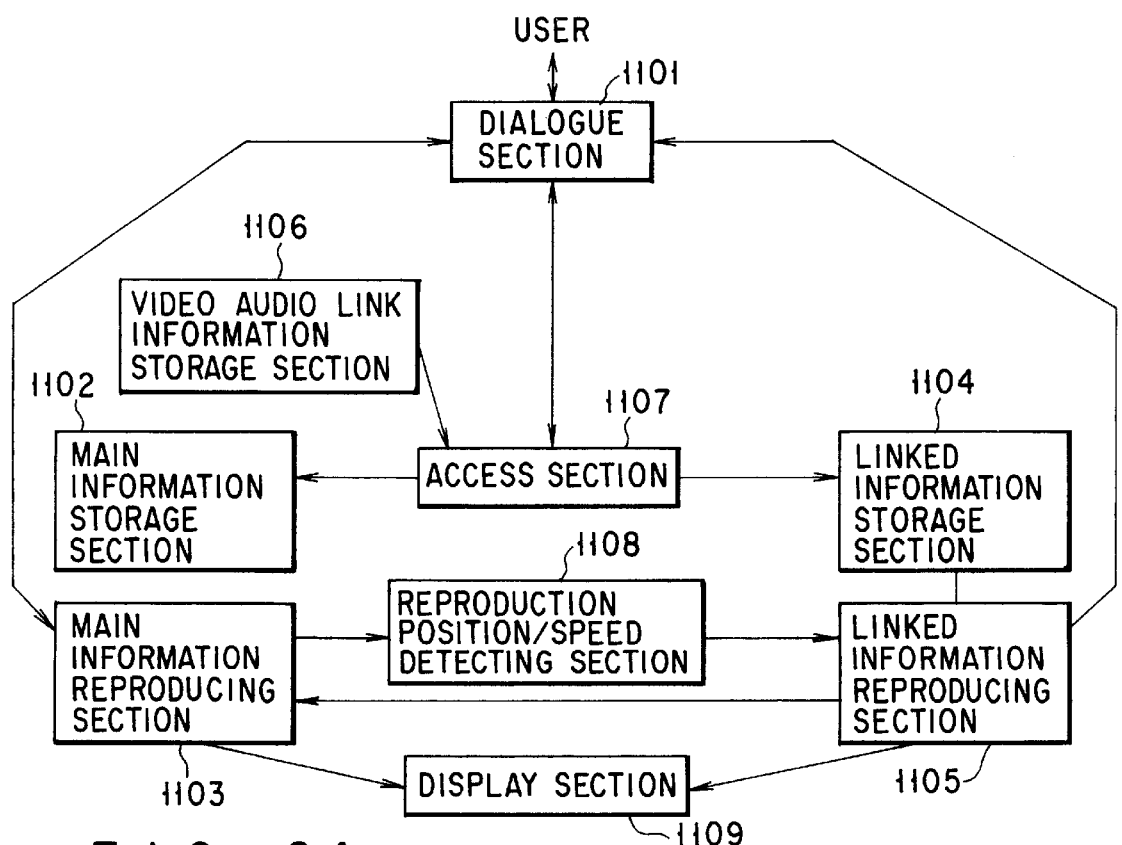
FIG. 24 is a block diagram showing a database system according to still another embodiment of the present invention.

FIG. 24 shows the schematic arrangement of a browsing system which allows the user to see a dynamic picture data, audio data, or sequential still picture data string, together with linked information set for the data. This browsing system can display links which are normally hidden in pictures, and hence can be suitably applied to, e.g., edition of hypermedia information. In a browsing operation, there is provided an environment allowing the user to comprehend linked information.

The respective blocks in FIG. 24 will be described first. A video/audio/link information storage section 1106 is an external disk such as an optical disk in which video/audio/link information is stored. If the system stores information of an external disk in an internal hard disk, an internal memory, and the like, the video/audio/link information storage section 1106 includes these memories. An access section 1107 sequentially accesses necessary information in the video/audio/link information storage section 1106. A main information storage section 1102 stores a dynamic/audio/sequential still picture data string, as main data, and link information of the information read out by the access section 1107. A main information reproducing section 1103 reads out data from the main information storage section 1102 and reproduces the data on a display section 1109 in accordance with an instruction from the user. A linked information storage section 1104 specifies and stores information linked with main information in accordance with link information. In addition, link information associated with the linked information is also stored in the linked information storage section 1104. A linked information reproducing section 1105 reproduces data read out from the linked information storage section 1104 on the display section 1109 while referring to the reproduction position/speed of main information detected by a reproduction position/speed detecting section 1108. A dialogue section 1101 transfers a request from the user in a browsing operation to the access section 1107, the main information reproducing section 1103, and the linked information reproducing section 1105.

The flow of processing in performing a browsing operation in this system will be described next. A request from the user, i.e., a request designating specific information to be browsed, a specific reproduction speed, and the like, is received by the dialogue section 1101. The dialogue section 1101 outputs commands to the access section 1107, the main information reproducing section 1103, and the linked information reproducing section 1105 in accordance with the received request. The access section 1107 reads out data from the video/audio/link information storage section 1106 in accordance with the command, and stores the data in main information storage section 1102 and the linked information storage section 1104. The main information reproducing section 1103 reads out data from the main information storage section 1102 and displays the data on the display section 1109 in accordance with the user request ("change reproduction speed", "pause", "turn over page", and the like). The reproduction position/speed detecting section 1108 detects information such as the current reproduction position and speed in accordance with data from the main information reproducing section 1103. The linked information reproducing section 1105 reproduces linked information by using the current reproduction position supplied from the reproduction position/speed detecting section 1108 and link information in the linked information storage section 1104. In this case, the display timing, display time, and the like of the linked information are properly controlled by using the current reproduction speed information. Alternatively, the reproduction speed of the main information reproducing section 1103 may be controlled to allow the user to easily see the linked information. The linked information is then displayed on the display section 1109, together with the main information.

The processing in the dialogue section and the respective reproducing sections will be described in detail below.

A reproduction method in the main information reproducing section 1103 will be described first. If main information is dynamic picture information, an operation to be performed is not very different from normal dynamic picture reproduction. The user can request reproduction, variable-speed reproduction, reverse reproduction, or the like. If main information is sequential till picture information, several reproduction methods can be used. There is a simple method of sequentially switching and displaying still pictures. In another method, still pictures are sequentially switched, similar to the above method, but each still picture is gradually changed to the next still picture upward or laterally as if stacked documents are sequentially turned over. These methods will be referred to as "page-turn-over type reproduction" hereinafter. In "page-turn-over type reproduction", the time intervals at which still pictures are switched are controlled in accordance with the above user request. In any case, a main picture is displayed in the center of the screen with margins being left on its four peripheral edges. Information linked by a linked information reproducing section (to be described later) is reproduced on a margin portion. In still another method, still pictures are connected to each other laterally or vertically to be reproduced as if a film were fed, as shown in FIG. 25. This reproduction method will be referred to as "film feed type reproduction" hereinafter. In "film feed type reproduction", the feed speed of still pictures is controlled in accordance with the above user request. If one frame of dynamic picture information is considered as a still picture, dynamic picture information can be reproduced by "film feed type reproduction". If main information is audio information, the same processing as that for dynamic picture information is performed. In this case, a picture is not displayed, or an index still picture attached to audio information is displayed.

The reproduction method in the linked information reproducing section 1105 will be described next. This portion is a main characteristic feature of this system. This reproduction method is devised to reproduce main information and to allow efficient browsing of information linked with the main information. The following two cases will be described below: a case wherein reproduction of main information is normal dynamic picture reproduction, page-turn-over type reproduction of still picture information, or reproduction of audio information; and a case wherein reproduction of main information is film feed type reproduction.

In the former case, linked information is basically displayed on a margin portion when a link source portion of main information is reproduced (FIG. 26). Since this system is designed to efficiently perform a browsing operation to find which kind of link structure is formed for specific main information and what information is set at the link destination, dynamic/still pictures are displayed in normal reproduction even if only link icons can be seen, or the presence of links cannot be seen at a glance. Instead of audio information, an icon representing that audio information is linked is displayed (FIG. 26).

The user can hear the linked audio information by designating this icon. If, however, main information includes no audio information, the main information and audio information can be simultaneously reproduced. If there is linked information while main information is reproduced, the presence of the linked information can be known. In film feed type reproduction, linked information appears along the flow of a film. If information at a link source is long in terms of time, linked information appears first along the flow of a film and remains on the screen while main information is kept at the link source. The linked information flows out of the screen at the same time when the last portion of the information at the link source flows out of the screen.

If, however, browsing is performed at a very high speed, or the duration of a link source is very short in a dynamic picture, it is difficult to comprehend the contents of the link, even though the presence of the link can be known. This system, therefore, has the following characteristic features to allow the user to comprehend the contents of a link even under such a condition. In this case, two characteristic features will be considered. By having one or both of the features, the system can provide the user with a comfortable environment.

When the main information reproducing section reproduces main information, it simultaneously reproduces linked information equivalent to a frame in reproduction from the video/audio/link information storage section. Linked information stored in the video/audio/link information storage section includes information indicating the attribute, address, display scheme, display position, and display size of linked information, information indicating that a linked frame is located a specific number of frames ahead (or behind), information indicating the position of a linked object, and the like. These pieces of information are recorded in units of frames.

This system is characterized in that linked information is written in not only a linked frame but also all or some of frames within a predetermined range before/after the linked frame. Information indicating that a linked frame is located a specific number of frames ahead (or behind) is recorded as information indicating that no link is connected to the corresponding frame, but a link is connected, for example, 30 frames ahead. As is apparent, if a link is connected to the frame, data indicating that the link is connected is recorded.

Information indicating that a linked frame is located a specific number of frames ahead (behind) is attached in the following manner. First of all, the user designates a frame which is to be linked by using a pointing device such as a mouse or a touch panel. The user then designates linked information. Link information can be written with respect to a frame which has been linked by the above operation. Subsequently, the system searches frames before/after the designated frame to detect that a linked frame is located a specific number of frames ahead (or behind) of the designated frame, and writes the corresponding information as link information of the frame. The range in which such an operation is performed may be limited to a range of frames in which main information and linked information can be simultaneously reproduced when the main information is reproduced at a high speed.

Display scheme information is information indicating how to display linked information when it is displayed simultaneously with main information. For example, display scheme information is displayed as information indicating that linked information is displayed by a fade-in/fade-out scheme, information indicating that display is performed such that linked information is gradually increased in size first, and decreased in size to disappear, or information indicating that linked information is displayed abruptly and disappears quickly. Position information about a linked object is recorded as information indicating the position of the object in a frame when links are formed in units of objects. In a frame which is not linked, the area of this information is normally empty. However, if the frame is located near a linked frame and includes a linked object, the position of this object may be recorded.

Figure 27:
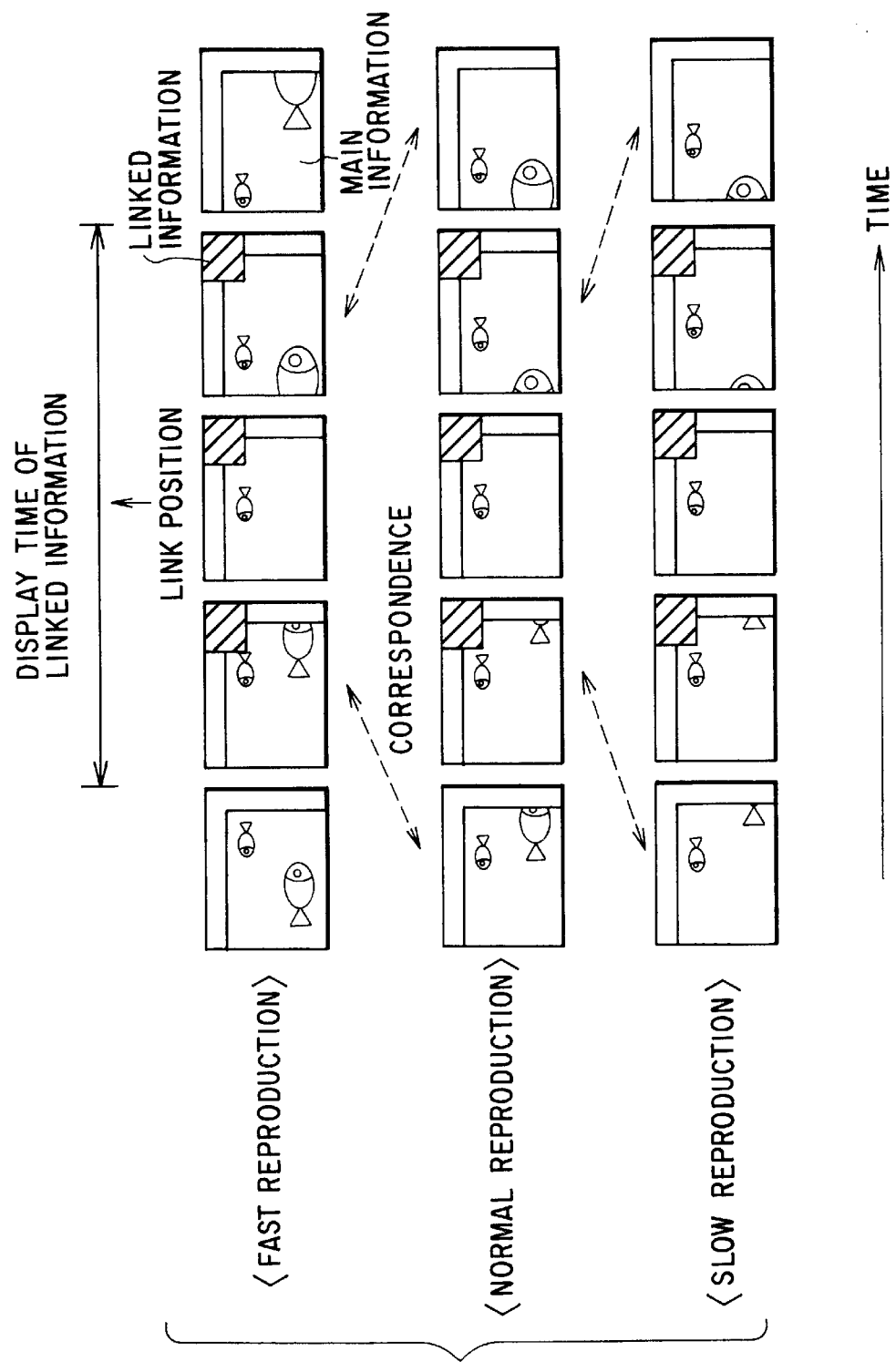
FIG. 27 is a view showing a method of displaying linked information by a fade-in/fade-out scheme.

A fade-in/fade-out display scheme applied to linked information as a display target will be described in detail below with reference to FIG. 27.

When a portion having linked information approaches the screen during reproduction of main information, the linked information gradually fades in, and gradually fades out as the information passes the linked portion. Such a display method is realized by the arrangement shown in FIG. 28. A faded state determining section 1110 determines the display start and end timings of linked information, a fading speed, and the like by referring to information from a reproduction position/speed detecting section 1108 for detecting the relative reproduction position and speed of a currently reproduced frame with respect to a linked frame. That is, in order to provide the user with linked information for a proper period of time, the fade-in and fade-out timings and the fading speed can be calculated on the basis of the distance between the current reproduction position of main information and the position of a link, the current reproduction speed, and the length of the linked frame.

With the above characteristic features, when linked information approaches the screen while main information is subjected to browsing at a high speed, the linked information is gradually displayed from a time point before the linked frame. Therefore, the user can know the presence of the linked information. In this case, the fade-in start time and fading speed are properly controlled to allow the user to recognize the linked information regardless of the reproduction speed of the main information.

Assume that the interval of a link is very short, or main information is reproduced at a very high speed. In this case, linked information is displayed only for a moment in the conventional system. Therefore, the user tends to overlook the linked information or miss the timing of issuing an instruction such as an instruction to pause or reproduce the linked information.

With the above control, however, the user can see linked information for a period of time long enough to recognize the linked information. In addition, linked information may be clearly displayed (or displayed with a frame enclosing the information to be noticeable) at the place where the link is actually connected (link position), and displayed indistinctly before and after the place. With this operation, the user can recognize whether the current position is located at or near the link position.

With fade-in of linked information, the user recognizes that a portion near a linked frame is being reproduced so that he/she can easily issue an instruction such as an instruction to pause, decrease the reproduction speed, or reproduce the linked information at the actual link position. Even if main information is audio information, the user can track the flow of link information while listening to a sound, thus allowing a comfortable browsing operation. These features constitute one of the characteristic features of the present invention.

The relationship between link information and linked information will be described in detail below. In reproducing dynamic picture information, the linked information reproducing section always refers to link information for each frame. Upon reading information indicating that a linked frame is located at a specific number of frames ahead, the linked information reproducing section performs a predetermined calculation with respect to the current dynamic picture reproduction speed and the number of frames located before the linked frame so as to determine whether to display the linked information. If it is determined that the linked information is displayed, the linked information reproducing section immediately starts to display the linked information by the above-described display scheme.

In this case, the display position of the linked information is also determined by the display position of the linked information described in the link information. The linked information is displayed either by a method of displaying an icon indicating the presence of the linked information, or by a method of actually reproducing the linked information (still picture, text, or dynamic picture information). If the linked information is audio information, the information is also displayed either by a method of displaying an icon indicating that audio information is linked, or by a method of actually reproducing the audio information.

Figure 29:
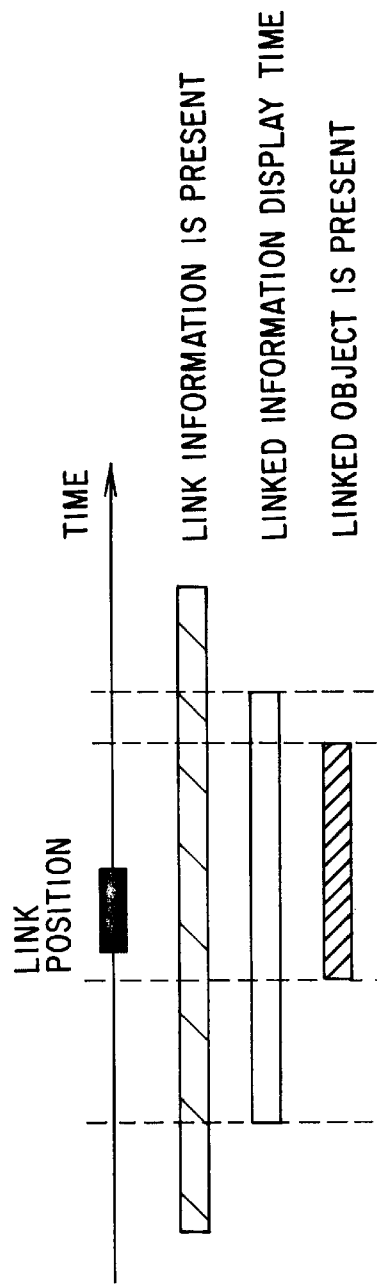

If the coordinate information of a linked object is present in the link information of a currently displayed frame, this system can display an arrow extending from the display position of linked information to the linked object in a dynamic picture (FIG. 29). The user can select whether to perform this display. When an arrow is displayed, the user can easily know which object is linked, or which object is described by the linked information. If the user wants to see main information without any unnecessary display, he/she can select not to display an arrow.

The coordinate position of the linked object changes in each frame in accordance with the movement of the object. For this reason, display is performed such that the arrow is moved in accordance with the movement of the linked object while the linked information is displayed. In a display operation, an arrow indicating a link relationship is kept displayed until the coordinate information of a linked object in the link information of a currently reproduced frame is lost, or display of linked information is ended.

Figure 30:
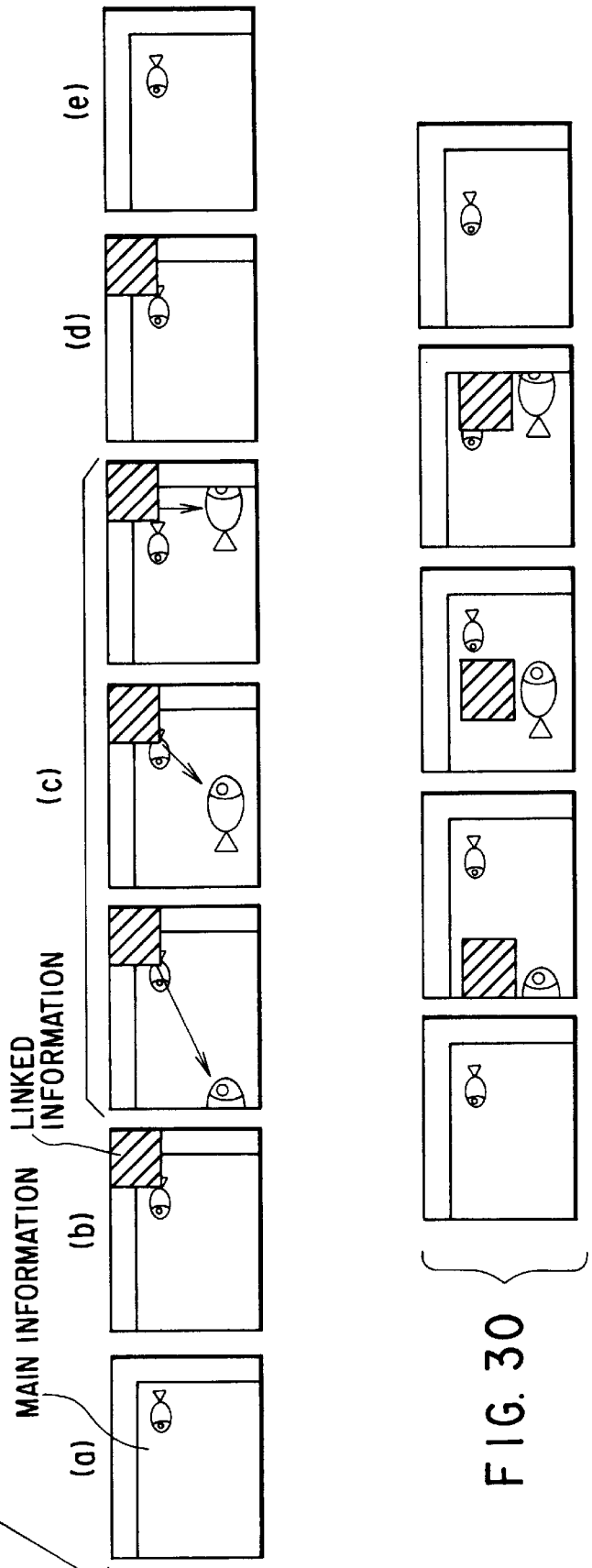
FIG. 30 is a view showing how linked information moves in accordance with the movement of an object.

In addition to the display method of indicating a linked object with an arrow, there is provided a method of displaying linked information near a linked object. In order to perform such display, linked information display position information in the link information of a frame may be set in accordance with the position of a linked object. If the display position information of the linked information is changed in accordance with the movement of the object, the display position of the linked information moves in accordance with the movement of the object, as shown in FIG. 30, thereby allowing the user to recognize with which object the linked information is associated at a glance.

Such a display, however, may interfere with a display of main information. Therefore, it is preferable that the user be able to select whether to perform such display of linked information. This method of moving the display position of linked information may be used in combination with the method of displaying an arrow. In addition, a linked object can be made noticeable by a method of enclosing a linked object with a circle or displaying the object in a noticeable color. For this method, the same techniques as those described above can be used.

In the above-described linked information display methods, link information is attached to a linked frame, and link information is also attached to frames before and after the linked frame. A linked information reproducing method applied to a case wherein link information is attached to only a linked frame will be described next.

FIG. 31 is a block diagram showing the arrangement of a linked information reproducing system applied to a case wherein link information is attached to only a linked frame. A main information reproducing section 1131 reproduces main information recorded on a main information recording section 1130. The main information is stored in a buffer 1133 for only a period of time corresponding to the reproduction speed of the main information. The main information is then displayed on a display section 1136. A reproduction position/speed detecting section 1132 detects the reproduction speed and position of the main information and sends the detected information to a linked information reproducing section 1135.

A link information storage section 1137 reads out link information associated with a frame corresponding to the reproduction position information sent from the reproduction position/speed detecting section 1132, and sends this link information to the linked information reproducing section 1135. Upon reception of the link information, the linked information reproducing section 1135 determines a position located a specific number of frames before the linked frame, at which reproduction of linked information is started, on the basis of the reproduction speed information of the main information. This determination method is the same as in the case wherein link information is attached to frames before and after a linked frame.

When the reproduction position of the linked information is determined, the linked information reproducing section 1135 reads out the linked information to be reproduced from a linked information recording section 1134, and sends the linked information to the display section 1136 in accordance with the timing at which a frame corresponding to the linked information reproduction position is output from the buffer 1133. Alternatively, the delay amount of the buffer 1133 is adjusted in accordance with the reproduction speed of the main information, and the main information is sent to the display section 1136 such that the frame and the linked information are synchronously displayed.

The display section 1136 displays the main information and the linked information upon synthesizing them. Even when main information is reproduced at a high speed, the buffer 1133 needs to have a capacity large enough to store frames at a linked information reproduction position. That is, the buffer 1133 needs to have a capacity large enough to store all frames, from a frame read out from the main information recording section 1130 to a frame in which linked information attached to the read frame is reproduced.

The methods of indicating a linked object with an arrow or changing the display position of linked information to allow the user to easily recognize the linked object cannot be performed unless the coordinates of the object or the display position information of the linked information is described in advance. If link information is attached to only a linked frame, the coordinates of an object and the display position information of linked information cannot be attached to a frame which is not actually linked but is displaying linked information attached to a near frame. Therefore, the above-described method of displaying a linked object with an arrow or the like cannot be employed. However, this problem is solved in the following manner.

First of all, all the coordinate information of a linked object in frames before and after a linked frame is described in linked information corresponding to the linked frame. According to this method, when the linked frame is read, the system knows the presence of the linked object at a specific coordinate position in a specific frame. By using this information, the system can display an arrow or can change the display position of linked information even for a non-linked frame.

By changing the arrangement of the system, as shown in FIG. 32, linked information can be displayed to be easily recognized. More specifically, an image recognition section 1138 is arranged between the buffer and the linked information reproducing section. When a linked frame is reproduced by the main information reproducing section, the frame is stored in the buffer, and link information corresponding to the frame is read from the link information recording section into the linked information reproducing section. The linked information includes the coordinate information of a linked object. The frame stored in the buffer is immediately sent to the image recognition section 1138, in which a linked object is specified on the basis of the link information.

In this case, the edge of the object is extracted by using an edge detection method such as a multiple resolution method (e.g., Iijima, "Basic Recognition Formulation and Observational Conversion for Graphic Patterns", THE PROCEEDINGS OF THE IEICE (C), pp. 641–648, 1971). When a linked object is specified from a linked frame, calculations are performed by using the obtained information to determine whether the linked object is present in a non-linked frame, and the coordinates of the linked object.

For this purpose, a motion vector extraction method such as block matching is sequentially applied to adjacent frames in the buffer, starting from the linked frame, thereby detecting the position of the same object in another frame. If the object disappears from a frame with a change in scene, this situation can be easily detected from great changes in consecutive frames. Therefore, in such a case, it is determined that no linked object is present in the subsequent frames, and the object extracting operation can be terminated.

In this manner, the movement of an object in consecutive frames is tracked. With this processing, even if the display start position of linked information has no link information, a linked object can be detected, if it exists, and processing such as displaying an arrow can be performed.

As is apparent, the above processing of detecting the position of an object in another frame by using the image recognition technique can be used not only when a link is referred but also when a link is formed. That is, when the user designates an object present in a given frame and links it, the edge of the object is detected by the same image recognition processing, and the obtained coordinate information is recorded as link information.

In addition, the motion vector extraction method is sequentially applied to adjacent frames, starting from the linked frame, to record the coordinate information of objects identical to the linked object on frames around the linked frame. With this operation, the information indicating the positions of the objects identical to the linked object can be recorded on the frames around the linked frame, together with the information indicating that the linked frame is near.

In addition to the methods of setting link information in a wide range, and using a buffer, there is a method of recording link information collectively at a predetermined position on a recording medium in advance, and causing the system to load the link information, thereby detecting the position of a linked frame.

Another method of allowing the user to easily recognize the presence of linked information during reproduction of main information may be used. In this method, when a portion having linked information approaches the screen, the reproduction speed of main information is decreased to such an extent that the user can recognize the linked information. This characteristic feature can be realized by the arrangement shown in FIG. 33.

A main information reproduction speed determining section 1112 determines the main information reproduction speed on the basis of information obtained by a reproduction position/speed detecting section 1108 and information obtained by a linked information storage section 1104, and sends it to a main information reproducing section 1103. More specifically, the main information reproduction speed determining section 1112 calculates how much the reproduction speed needs to be decreased to allow the user to recognize the linked information, on the basis of the current reproduction speed of the main information and the length of a linked portion. The main information reproduction speed determining section 1112 then determines the position where reduction in reproduction speed is started and the pace of reduction in reproduction speed on the basis of the position of the linked portion and the current reproduction speed.

A reproducing section 1113 compares the current reproduction position of the main information, obtained by the reproduction position/speed detecting section 1108, with the link position obtained by the linked information storage section 1104. Upon determining that the linked portion has reached the position where the linked information is to be reproduced, the reproducing section 1113 reads out information from the linked information storage section 1104 and reproduces the information. FIG. 34 shows the reproduction speed of the main information and the displayed information in this case.

In order to change the reproduction speed before and after a portion having linked information, the link position must be determined in advance at the time points at which portions before and after the linked information are reproduced. As means for this operation, for example, the following two methods are available (FIGS. 31 and 32). In one method, information indicating that the linked frame is near is described beforehand in link information corresponding to each of frames located before and after the linked frame. In the other method, a large-capacity buffer is used to store information about frames located far ahead a currently displayed frame. The details of these methods are the same as those of the method of changing the reproduction position of the linked information.

In addition, the methods of displaying an arrow indicating an object and changing the display position of linked information so as to allow the user to easily recognize the linked object can be easily realized by describing the display positions of an object and linked information in link information.

The following effects can be obtained by the above characteristic features. When reproduction/browsing is performed at a high speed, or a linked portion is short, the reproduction speed is reduced as linked information approaches the link point, thereby reproducing the link information to allow the user to easily recognize it. If main information is limited to dynamic picture information, the length of a linked portion can be obtained from the reproduction speed at the link point. These features also constitute one of the characteristic features of the present invention. This above characteristic feature can be suitably applied to the above film feed type reproduction.

If a system having the above characteristic features is constructed, a further suitable browsing environment can be formed.

In the above case, browsing is performed with respect to one video information, as main information, and information linked therewith. A video information reproducing apparatus which can perform browsing throughout many video files when pieces of video information are complicatedly related with each other via links will be described next. The arrangement of this apparatus is almost the same as that shown in FIG. 24.

Operations performed by the user and changes in screen will be sequentially described below. FIG. 35 shows the arrangement of the screen. A picture A is displayed in one frame 1120 of several split frames. This picture may be a dynamic picture or a still picture. A color frame 1121 indicating that the picture in this frame is being reproduced is attached to the frame 1120. Browsing can be performed by performing fast reproduction or reverse reproduction of this picture. If there is information linked with the picture in this case, the information appears in an adjacent frame 1122 (FIG. 36).

This information appears by the fade-in scheme to allow the user to recognize it even during fast reproduction, as in the previous embodiment. This embodiment is different from the previous embodiment in that a main picture and a linked picture are displayed in the same size, and the two pictures are connected via a line 1123 to allow the user to know a link relationship. This line is displayed in a light color while the linked picture fades in/fades out, and is displayed in a deep color when the linked picture has appeared completely. Referring to FIG. 37, sets of reference symbols A1 to A6 and B1 to B5 denote pictures; and each of reference symbols A1, A2, . . . , one frame (or still picture). A line having a deep color indicates that currently displayed frames (or still pictures) (A5 and B2) are connected to each other via a link (FIG. 38), whereas a line having a light color indicates that frames (or still pictures) other than the currently displayed frames are connected to each other via a link (FIG. 39).

If the user wants to look a linked picture B, which is currently appearing, more carefully, he/she can issue an instruction to reproduce the linked picture B. As a result, the picture B can be subjected to browsing in place of the main picture. In this case, a color frame 1124 indicating a main picture is shifted, and the picture A which has been the main picture stops there. When the portion connected to the picture A via the link passes as the picture B is reproduced, the color of a line 1125 changes to a light color (FIG. 40).

Figure 42:
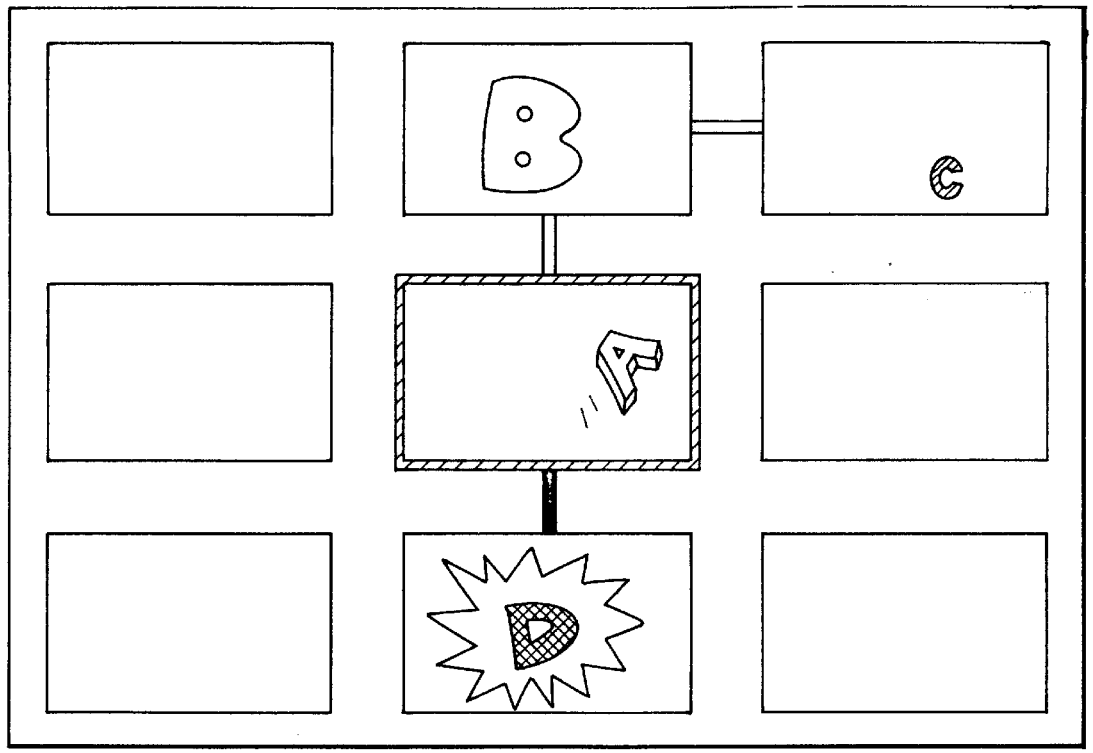
Figure 43:
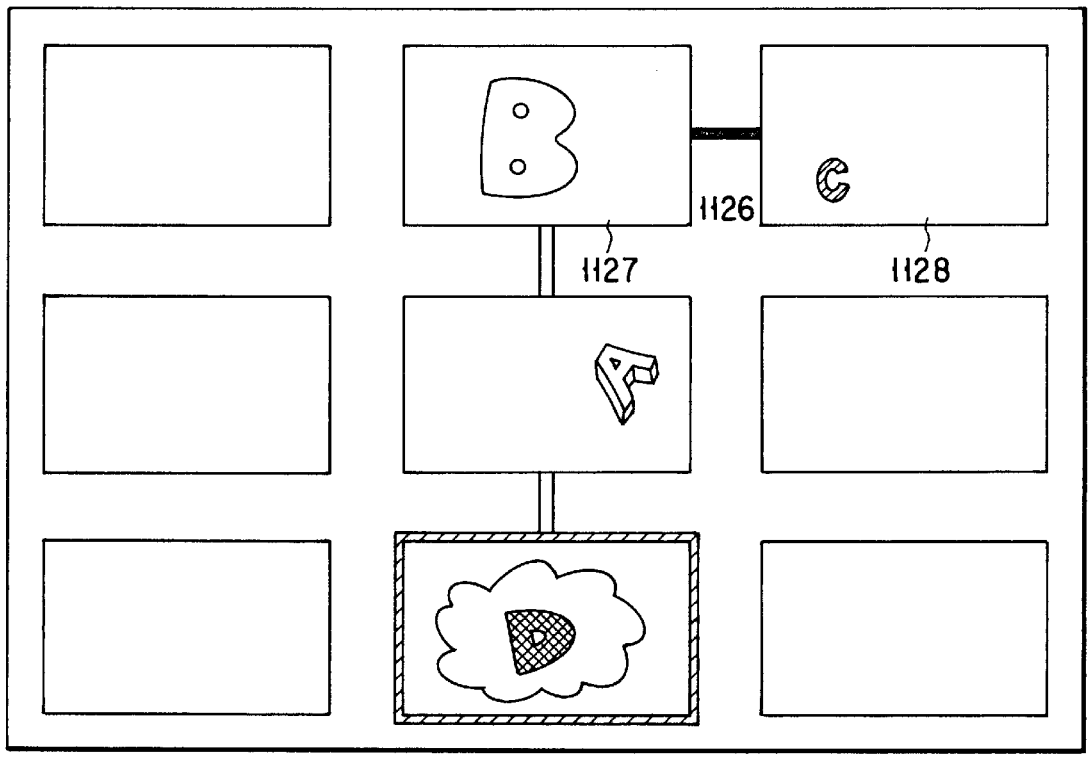

If the user wants to browse a linked picture C again which appeared during browsing of the picture B, he/she can browse the picture C as a main picture by issuing a corresponding instruction (FIG. 41). If the user wants to browse the picture A, he/she can return to the picture A. In this case, a linked picture appears in a frame different from that of the picture B so that another linked picture D can be subjected to browsing (FIG. 42). In this process, since pictures which appear once remain unless "delete" is designated, and a lack of frames occurs, the previous pictures can always be subjected to browsing, and the link relationships can be determined from lines. In addition, by selecting and designating a link (line 1126), portions 1127 and 1128 connected to each other via the link can be called from the pictures connected to each other via the link (FIG. 43).

In the above embodiment, one display unit is used. However, a browsing system using a plurality of display units can be constructed with one frame in the above embodiment being caused to correspond to one display unit. In this case, a means for displaying the link relationships among pictures displayed on the respective display units is preferably arranged independently. If a buffer memory and a reproducing section are arranged for each display unit, a plurality of pictures can be subjected to browsing at a higher speed.

The following effects can be obtained by the present invention described in detail above. When link information is defined between images or sounds, proper processing can be performed in processing or copying information.

According to the file management scheme of the information recording/reproducing apparatus of the present invention, files which are frequently referred are moved into the same disk without troubling the user. Therefore, the user need not replace disks, and can refer to files at a high speed. Since files are moved in accordance with a change in reference rate, i.e., a decrease or increase in reference rate with respect to files, a state in which disks need to be replaced less frequently can always be maintained.

According to the still picture display scheme, since the relationship between still pictures is expressed as a distance, their relationship can be visually recognized. In addition, since still pictures which are not referred very much are automatically set as pictures which are not displayed, the user can search for a desired still picture without referring to still pictures uselessly too often.

According to the link structure creating method of the present invention, a link structure is created by using link information which is completed to a certain degree. Therefore, a link structure can be formed by this method more easily than by a method of creating a link structure from the beginning. In addition, since a link structure is created by processing a basic link structure, a link structure which is relatively easy to comprehend can be created.

In the disk management box according to the present invention, a disk in which a file found by a file search operation is stored is selected and ejected from the disk management box. Therefore, the user need not search a group of disks for a disk, unlike in the conventional system, thus providing a comfortable search environment.

According to the present invention, since a database structure is created in accordance with the manner in which each user uses his/her own database, a suitable browsing operation can be performed.

According to the present invention, the users can add necessary links and nodes and delete unnecessary links and nodes by himself/herself. Therefore, the users can create an easy-to-use database structure. In addition, since the users have information added to a common database structure, even a user having no user information can use the database.

According to the present invention, by forming empty nodes, a database can be formed by only taking pictures. With such an environment, the user can use the database more easily. In addition, the use can use the database without being conscious of links.

According to the present invention, grouping and linking are automatically performed to a certain degree when the user only inputs information. Therefore, the load on the user in using the database can be reduced. In addition, the system is set to be ready for a search operation (e.g., searching for a picture taken at a specific place) to a certain degree when the user only inputs information.

According to the present invention, the user can input information by depressing a transparent tablet stacked on a liquid crystal display unit, on which menu icons are displayed, instead of using buttons on a remote controller. The system can display buttons which can be selected at a given time point, and hence can minimize confusion experienced by the user.

According to the present invention, browsing of video and audio information can be performed, together with that of link information attached thereto. The manner of displaying link information is controlled to allow the user to comprehend link information even when browsing is performed at a high speed or a link is formed only for a moment.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. An information recording/reproducing apparatus comprising:

means for displaying main information including a specific object;

means for displaying linked information related to the main information;

means for controlling at least one of a display timing of the linked information and a display speed of the main information in accordance with link information representing a relationship between the main information and the linked information and display speed information of the main information;

means for changing display for, when display for indicating an object to which linked information is related with regard to the specific object included in the main object and display of the linked information related to the object are performed, changing the display for indicating the object in accordance with display position information of the object; and means operated by a user to directly input position information for only a partial interval and adapted to detect, using display position information of the object in the partial interval, display positions of the object throughout an interval other than the partial interval, for which the user inputs the position information.

2. An information recording/reproducing method comprising:

a step of displaying main information including a specific object;

a step of displaying linked information related to the main information;

a step of controlling at least one of a display timing of the linked information and a display speed of the main information in accordance with link information representing a relationship between the main information and the linked information and display speed information of the main information;

a step of changing display for, when display for indicating an object to which linked information is related with regard to the specific object included in the main object and display of the linked information related to the object are performed, changing the display for indicating the object in accordance with display position information of the object; and a step of inputting position information for only a partial interval and using display position information of the object in the partial interval to detect display positions of the object throughout an interval other than the partial interval, for which the position information is inputted.

* * * * *